United States Patent
Hwang et al.

(10) Patent No.: US 12,281,915 B2
(45) Date of Patent: Apr. 22, 2025

(54) METHOD AND DEVICE FOR GENERATING VRU PATH MAP RELATED TO MOVING PATH OF VRU BY SOFTV2X SERVER IN WIRELESS COMMUNICATION SYSTEM SUPPORTING SIDELINK

(71) Applicant: LG ELECTRONICS INC., Seoul (KR)

(72) Inventors: Jaeho Hwang, Seoul (KR); Hakseong Kim, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 272 days.

(21) Appl. No.: 17/801,063

(22) PCT Filed: Mar. 15, 2021

(86) PCT No.: PCT/KR2021/003191
§ 371 (c)(1),
(2) Date: Aug. 19, 2022

(87) PCT Pub. No.: WO2021/182935
PCT Pub. Date: Sep. 16, 2021

(65) Prior Publication Data
US 2023/0080095 A1 Mar. 16, 2023

(30) Foreign Application Priority Data

Mar. 13, 2020 (KR) .................. 10-2020-0031509
Mar. 27, 2020 (KR) .................. 10-2020-0037781

(51) Int. Cl.
G01C 21/00 (2006.01)
G08G 1/01 (2006.01)
H04W 4/40 (2018.01)

(52) U.S. Cl.
CPC ..... *G01C 21/3841* (2020.08); *G01C 21/3807* (2020.08); *G08G 1/0145* (2013.01); *H04W 4/40* (2018.02)

(58) Field of Classification Search
CPC .......... G01C 21/3841; G01C 21/3807; G01C 21/34; G08G 1/0145; G08G 1/164;
(Continued)

(56) References Cited

U.S. PATENT DOCUMENTS

2015/0035685 A1 2/2015 Strickland et al.
2017/0344225 A1* 11/2017 Albouyeh ............... G06F 40/30
(Continued)

FOREIGN PATENT DOCUMENTS

KR 1020190017171 A 2/2019

*Primary Examiner* — Donald J Wallace
*Assistant Examiner* — Jalal C Coduroglu
(74) *Attorney, Agent, or Firm* — BRYAN CAVE LEIGHTON PAISNER LLP

(57) ABSTRACT

Disclosed are a method and a device for generating a VRU path map related to a moving path of a VRU by a first device in a wireless communication system supporting a sidelink according to various embodiments. Disclosed are a method and a device therefor, the method comprising the steps of: collecting a plurality of VRU moving paths from a plurality of VRU messages; generating a VRU path map on the basis of the plurality of VRU moving paths; and transmitting a first message including information on the VRU path map, wherein the SoftV2X server determines, on the basis of path data, joints where two or more VRU paths are branched, determines a VRU path located between two joints on the basis of the determined joints, generates node information on the VRU path on the basis of the path data, and generates the VRU path map including the node information.

7 Claims, 30 Drawing Sheets

(58) Field of Classification Search
CPC .......... G08G 1/166; H04W 4/40; H04W 4/02; H04W 4/024; H04W 4/029; H04W 4/12; Y02D 30/70
See application file for complete search history.

(56) References Cited

U.S. PATENT DOCUMENTS

| | | |
|---|---|---|
| 2018/0242115 A1* | 8/2018 | Kim .................. H04W 8/02 |
| 2019/0011925 A1 | 1/2019 | Bansal et al. |
| 2019/0075447 A1* | 3/2019 | Lee ................... H04W 68/02 |
| 2019/0110175 A1* | 4/2019 | Chun ................. H04W 80/06 |
| 2019/0287395 A1 | 9/2019 | Aoude et al. |
| 2019/0289462 A1* | 9/2019 | Kim ................... H04W 8/20 |
| 2019/0306678 A1* | 10/2019 | Byun ................. H04W 88/04 |
| 2019/0317973 A1* | 10/2019 | Albouyeh .......... G06F 16/9535 |
| 2019/0357026 A1* | 11/2019 | Hwang .............. H04W 4/12 |
| 2020/0018613 A1 | 1/2020 | Stenneth |
| 2020/0021960 A1* | 1/2020 | Hwang .............. G06Q 10/0635 |
| 2020/0037127 A1* | 1/2020 | Hwang .............. B60W 50/00 |
| 2020/0367096 A1* | 11/2020 | Hwang .............. H04W 28/0289 |
| 2020/0396791 A1* | 12/2020 | Kim ................... H04W 76/30 |
| 2021/0160728 A1* | 5/2021 | Jung .................. H04L 5/0064 |
| 2021/0250772 A1* | 8/2021 | Farag ................. H04W 16/02 |
| 2022/0332350 A1* | 10/2022 | Jha .................... B60W 60/0017 |
| 2022/0383750 A1* | 12/2022 | Sharma Banjade ... G08G 1/005 |
| 2022/0388505 A1* | 12/2022 | Sharma Banjade ........................ G08G 1/096783 |

\* cited by examiner

FIG. 6
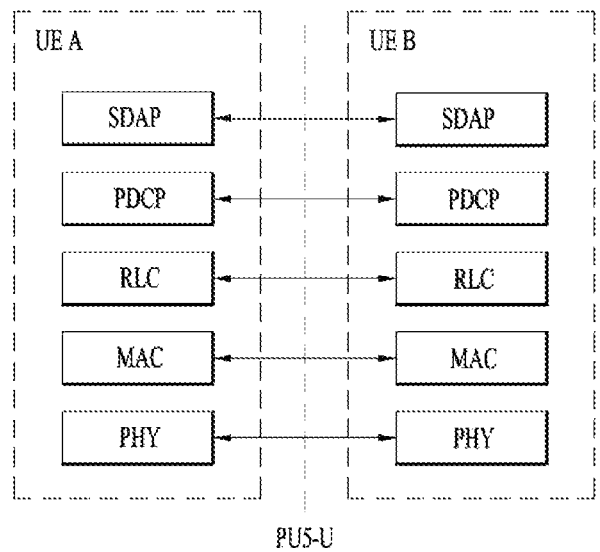
(a)
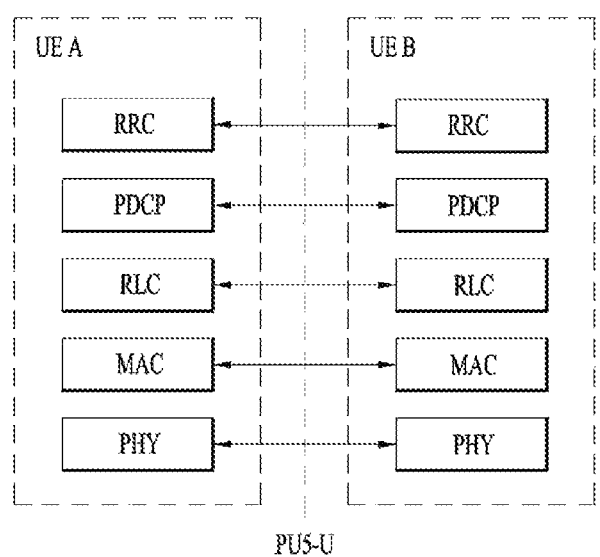
(b)

FIG. 10
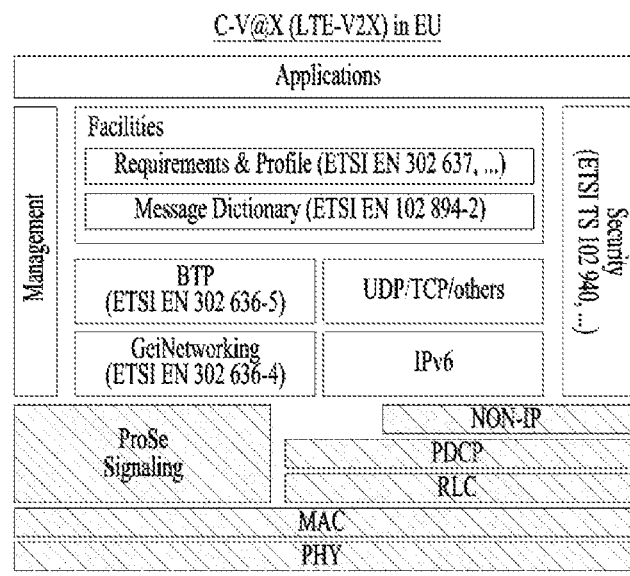
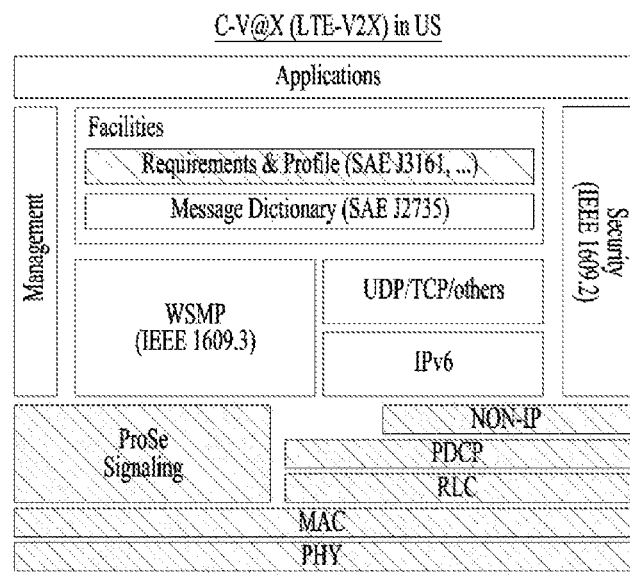

FIG. 13
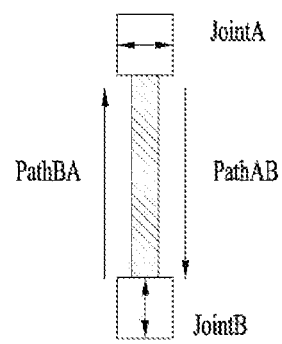
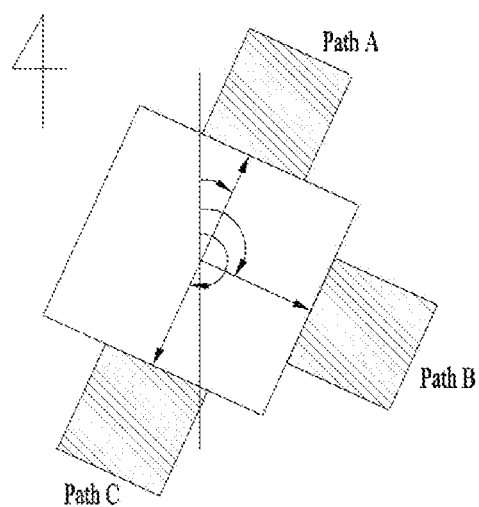

| MultiPathID | #1 | #2 | #3 | #4 |
|---|---|---|---|---|
| PathPrediction | Path1 | Path2 | Path3 | |
| PathExpectation | 70% | 20% | 10% | |

PSM message #1

PSM message #2

METHOD AND DEVICE FOR GENERATING VRU PATH MAP RELATED TO MOVING PATH OF VRU BY SOFTV2X SERVER IN WIRELESS COMMUNICATION SYSTEM SUPPORTING SIDELINK

This application is the National Stage filing under 35 U.S.C. 371 of International Application No. PCT/KR2021/003191 filed on Mar. 15, 2021, which claims priority to Korean Patent Application Nos. 10-2020-0031509 filed on Mar. 13, 2020 and 10-2020-0037781 filed on Mar. 27, 2020, the contents of which are all hereby incorporated by reference herein in their entirety.

TECHNICAL FIELD

The present disclosure relates to a method and device for generating a VRU path map based on VRU movement paths acquired from a plurality of VRU messages by a SoftV2X server in a wireless communication system for supporting sidelink.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

DISCLOSURE

Technical Problem

An object of the present disclosure is to provide a method and device for supporting effective prediction of a movement path of neighbor VRUs by acquiring a plurality of VRU movement paths based on a plurality of VRU messages collected by a SoftV2X network and providing a VRU path map generated based on the acquired plurality of VRU movement paths to the neighbor VRUs.

It will be appreciated by persons skilled in the art that the objects that could be achieved with the various embodiments of the present disclosure are not limited to what has been particularly described hereinabove and the above and other objects that the various embodiments of the present disclosure could achieve will be more clearly understood from the following detailed description.

Technical Solution

According to an aspect of the present disclosure, a method of generating a vulnerable road user (VRU) path map related to a movement path of a VRU by a first device in a a wireless communication system for supporting sidelink includes collecting path data from a plurality of VRU messages, generating the VRU path map based on the path data, and transmitting a first message including information on the VRU path map, wherein the SoftV2X server determines joints from which two or more VRU paths are branched based on the path data, determines a VRU path positioned between two joints based on the determined joints, generates node information of the VRU path based on the path data, and generates the VRU path map including the node information of each of the plurality of VRU paths.

The node information may include joint information of each of two corresponding joints, and the joint information may include probability information and angle information for each of the two or more VRU paths branched from the joint.

The node information may include a curvature, event information, a path width, and a VRU average moving speed for the VRU path.

The SoftV2X server may calculate a normal distribution function based on first path data related to the VRU path from the path data, and may determine the path width of the VRU path using path data within a predetermined variance value based on the calculated normal distribution function.

The predetermined variance value may be differently determined according to a channel congestion related to the VRU path and the curvature.

The predetermined variance value may be determined based on position reliability included in the VRU message.

The SoftV2X server may determine whether there is a VRU deviating from the VRU path based on the path width.

The SoftV2X server may determine a zone ID corresponding to the joint using a predetermined width and latitude and longitude for the joint, and the VRU path map may provide information on joints corresponding to the respective zone IDs.

Each of the plurality of VRU messages may include information on a sequence indicating a position of the VRU device at a predetermined time interval.

According to another aspect of the present disclosure, a method of predicting a movement path by a vulnerable road user (VRU) based on a VRU path map in a wireless communication system for supporting sidelink includes receiving a first message including information on the VRU path map, predicting a VRU movement path based on the VRU path map, and transmitting a second message including information related to the predicted VRU movement path, wherein the VRU path map includes information on a probability and an angle for a joint from which two or more VRU paths are branched and each of two or more paths branched from the joint, and the VRU device determines the two or more joints corresponding to a position of the VRU device based on the VRU path map, and transmits the second message including information on each of the two or more joints and information on a moving probability of each of the two or more joints.

According to another aspect of the present disclosure, a SoftV2X server for generating a vulnerable road user (VRU) path map related to a movement path of a VRU in a wireless communication system for supporting sidelink includes a radio frequency (RF) transceiver, and a processor connected to the RF transceiver, wherein the processor controls the RF transceiver to collect path data from a plurality of VRU messages, determines joints from which two or more VRU paths are branched based on the path data, determines a VRU path positioned between two joints based on the determined joints, generates node information of the VRU path based on the path data, generates the VRU path map including the node information of each of the plurality of VRU paths, and transmits a first message including information on the VRU path map.

The node information may include joint information of each of two corresponding joints, and the joint information may include probability information and angle information for each of the two or more VRU paths branched from the joint.

According to another aspect of the present disclosure, a vulnerable road user (VRU) for predicting a movement path based on VRU path map in a wireless communication system for supporting sidelink includes a radio frequency (RF) transceiver, and a processor connected to the RF transceiver, wherein the processor controls the RF transceiver to receive a first message including information on the VRU path map, predicts a VRU movement path based on the VRU path map, and transmits a second message including information related to the predicted VRU movement path, the VRU path map includes information on a probability and an angle for a joint from which two or more VRU paths are branched and each of two or more paths branched from the joint, and the processor determines the two or more joints corresponding to a position of the VRU device based on the VRU path map, and transmits the second message including information on each of the two or more joints and information on a moving probability of each of the two or more joints.

According to another aspect of the present disclosure, a chip set for generating a vulnerable road user (VRU) path map related to a movement path of a VRU in a wireless communication system for supporting sidelink includes at least one processor, and at least one memory operatively connected to the at least one processor and configured to cause the at least one processor to perform an operation when being executed, wherein the operation includes collecting path data from a plurality of VRU messages, determining joints from which two or more VRU paths are branched based on the path data, determining a VRU path positioned between two joints based on the determined joints, generating node information of the VRU path based on the path data, generating the VRU path map including the node information of each of the plurality of VRU paths, and transmitting a first message including information on the VRU path map.

According to another aspect of the present disclosure, a computer-readable storage medium including at least one computer program for generating a vulnerable road user (VRU) path map related to a movement path of a VRU by at least one processor in a wireless communication system for supporting sidelink includes at least one computer program configured to cause the at least one processor to perform an operation of generating a VRU path map related to the VRU, and a computer-readable storage medium for storing the at least one computer program therein, wherein the operation includes collecting path data from a plurality of VRU messages, determining joints from which two or more VRU paths are branched based on the path data, determining a VRU path positioned between two joints based on the determined joints, generating node information of the VRU path based on the path data, generating the VRU path map including the node information of each of the plurality of VRU paths, and transmitting a first message including information on the VRU path map.

Advantageous Effects

According to various embodiments, effective prediction of a movement path of neighbor VRUs may be supported by acquiring a plurality of VRU movement paths based on a plurality of VRU messages collected by a SoftV2X network and providing a VRU path map generated based on the acquired plurality of VRU movement paths to the neighbor VRUs.

Effects to be achieved by embodiment(s) are not limited to what has been particularly described hereinabove and other effects not mentioned herein will be more clearly understood by persons skilled in the art to which embodiment(s) pertain from the following detailed description.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

FIG. 6 illustrates a radio protocol architecture for SL communication.

FIG. 10 illustrates an exemplary structure of an ITS station that may be designed and applied based on a reference architecture.

FIGS. 13 and 14 are diagrams for explaining a method of modeling a VRU path by a SoftV2X server.

BEST MODE

Figure 1:
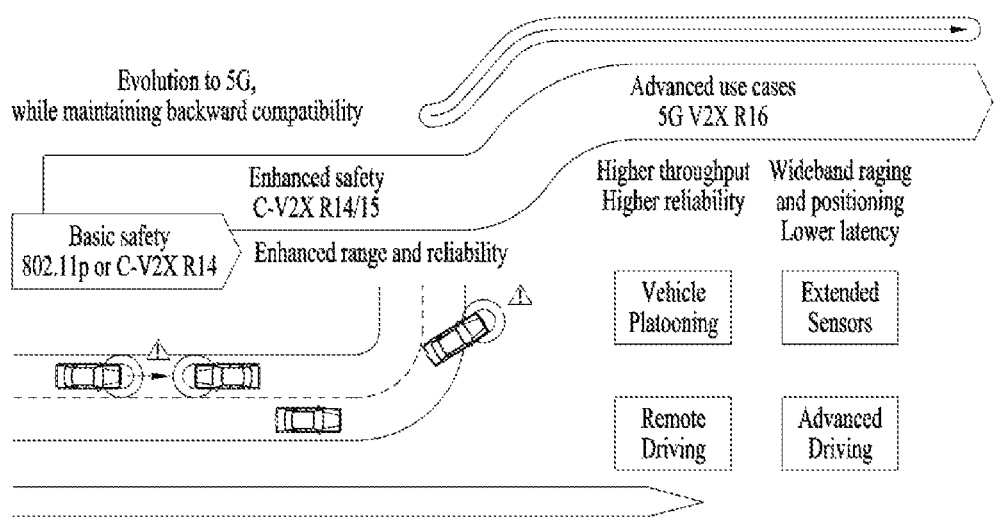
FIG. 1 is a diagram for explaining by comparing V2X communication based on RAT before NR and V2X communication based on NR.

The wireless communication system is a multiple access system that supports communication with multiple users by sharing available system resources (eg, bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc.

CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

Figure 2:
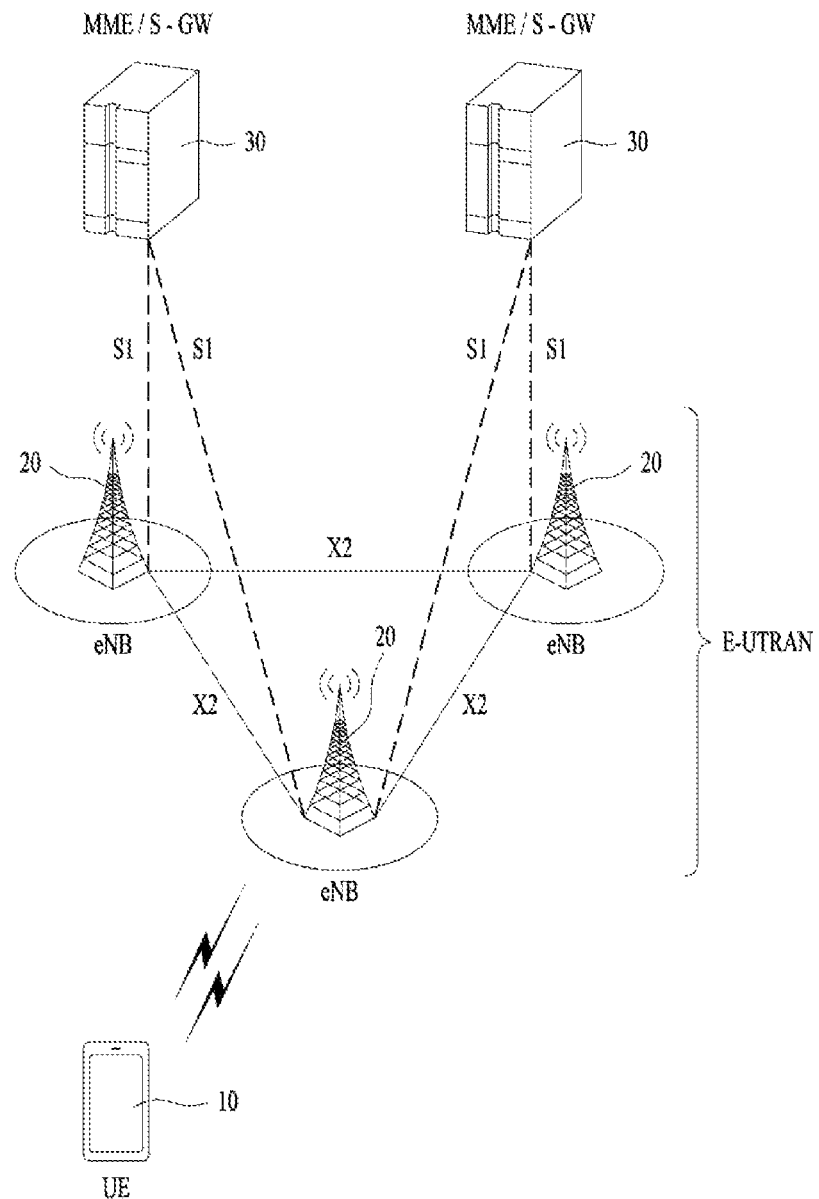
FIG. 2 illustrates the structure of an LTE system to which embodiment(s) are applicable.

For clarity of explanation, LTE-A or 5G NR is mainly described, but the technical spirit of the embodiment(s) is not limited thereto FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
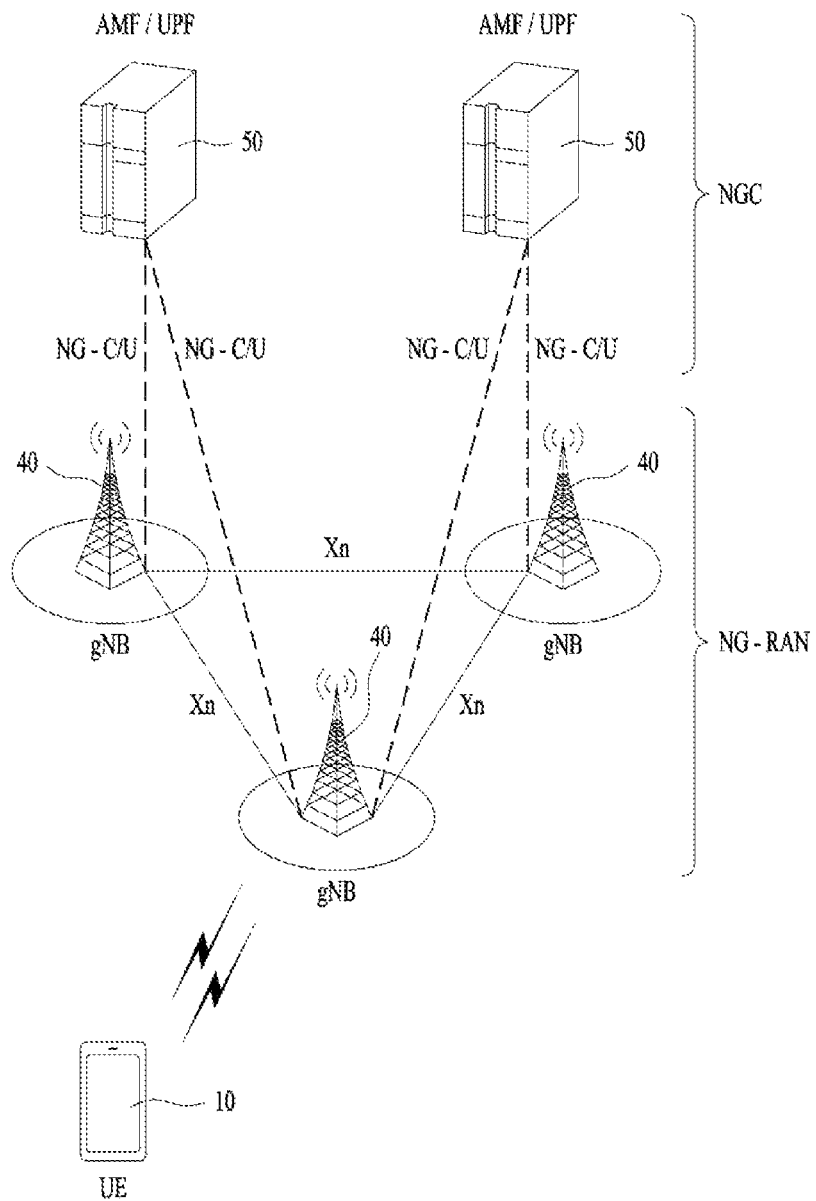
FIG. 3 illustrates the structure of an NR system to which embodiment(s) are applicable.

FIG. 3 illustrates the structure of a NR system to which the present disclosure is applicable.

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 4:
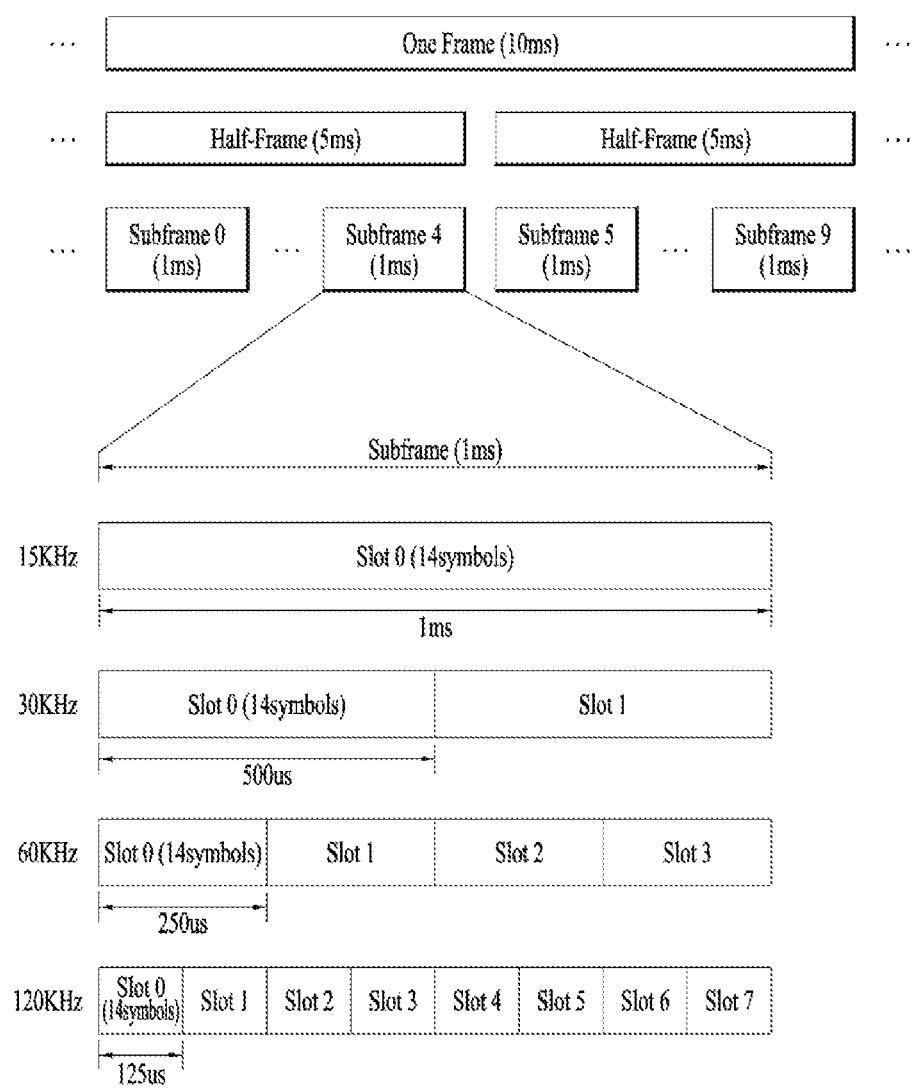
FIG. 4 illustrates the structure of an NR radio frame to which embodiment(s) are applicable.

FIG. 4 illustrates the structure of a NR radio frame to which the present disclosure is applicable.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,\mu}_{slot}$, and the number of slots per subframe $N^{subframe,\mu}_{slot}$ according to an SCS configuration µ in the NCP case.

TABLE 1

| SCS (15 * 2u) | $N^{slot}_{symb}$ | $N^{frame,\mu}_{slot}$ | $N^{subframe,\mu}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15 * 2^u) | $N^{slot}_{symb}$ | $N^{frame,\mu}_{slot}$ | $N^{subframe,\mu}_{slot}$ |
|---|---|---|---|
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 5:
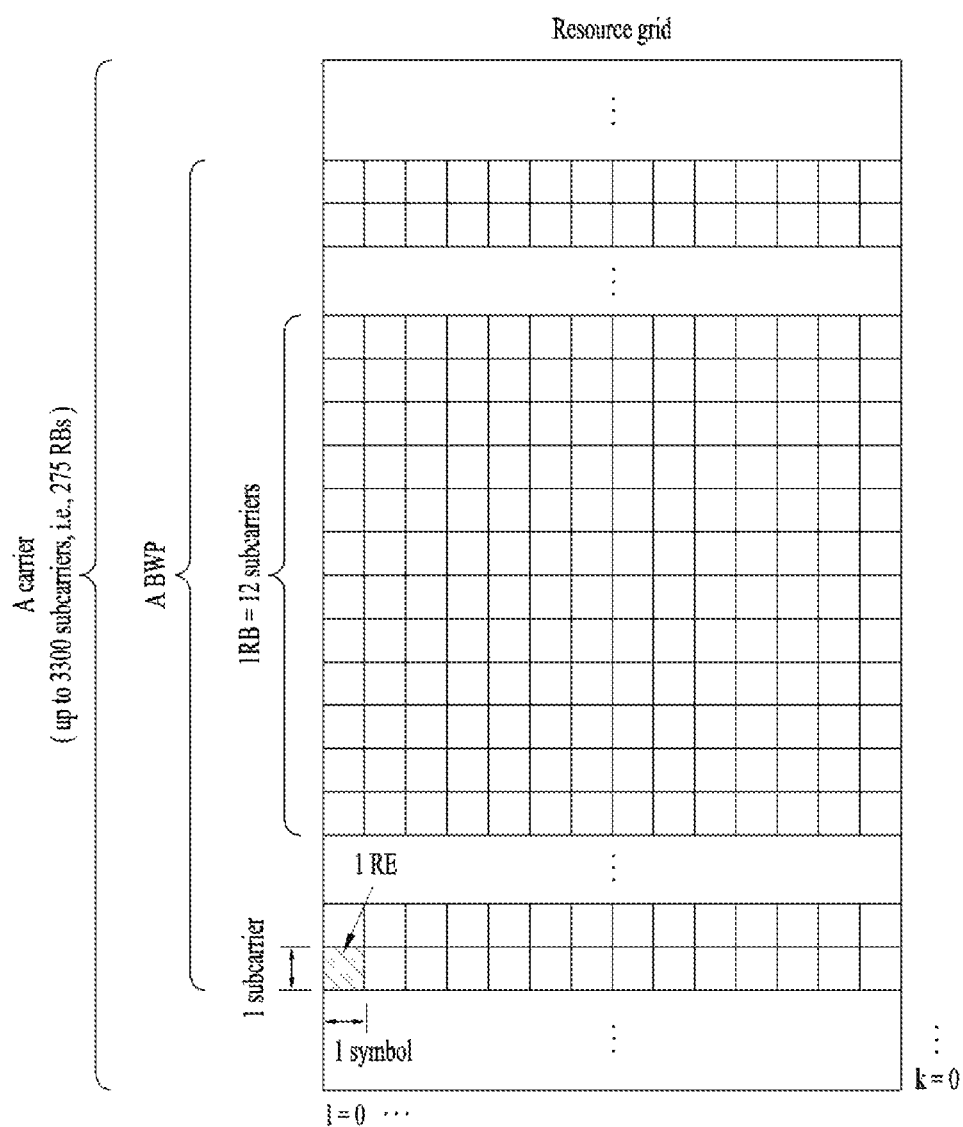
FIG. 5 illustrates the slot structure of an NR frame to which embodiment(s) are applicable.

FIG. 5 illustrates the slot structure of a NR frame to which the present disclosure is applicable.

Referring to FIG. 5, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

FIG. 6 illustrates a radio protocol architecture for SL communication. Specifically, FIG. 6-(a) shows a user plane protocol stack of NR, and FIG. 6-(b) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be pre-configured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 7:
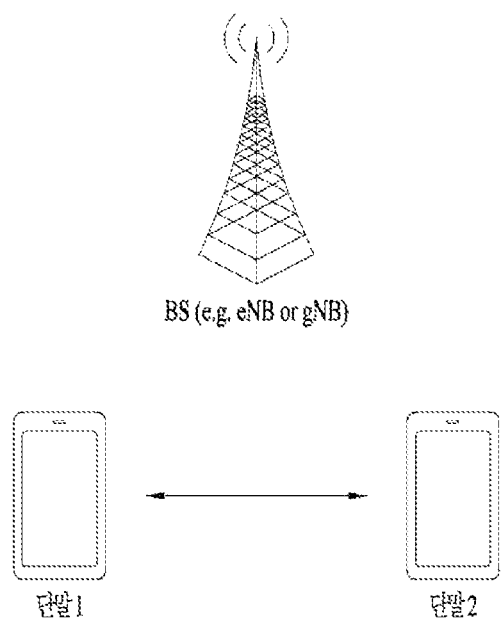
FIG. 7 illustrates UEs performing V2X or SL communication.

FIG. 7 illustrates UEs performing V2X or SL communication.

Referring to FIG. 7, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 8:
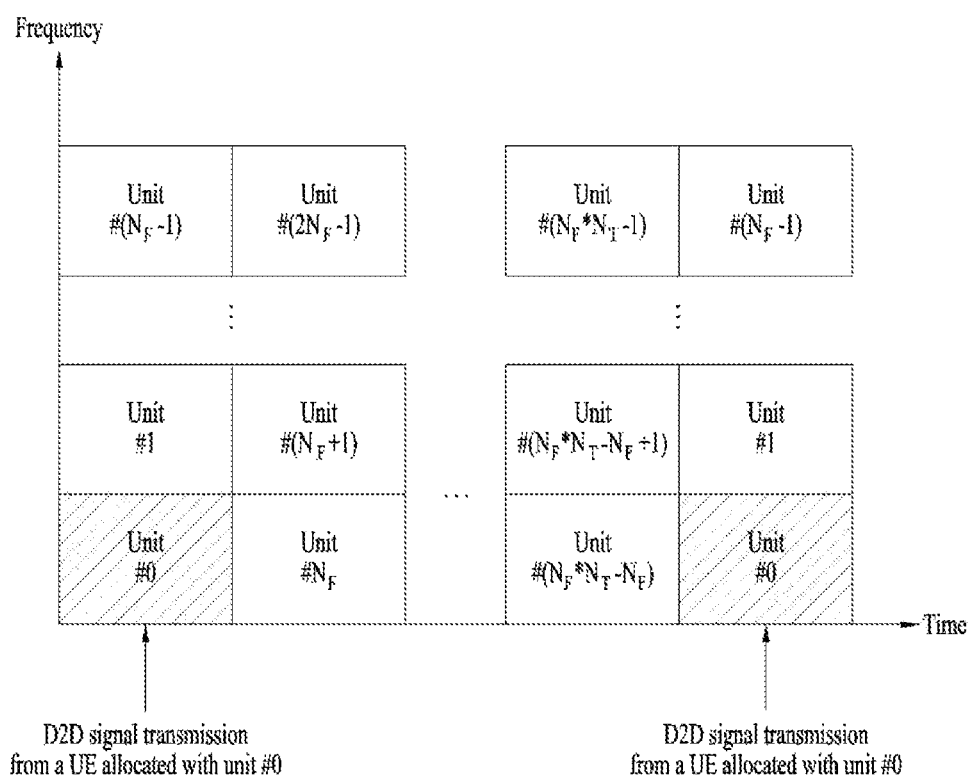
FIG. 8 illustrates resource units for V2X or SL communication.

FIG. 8 illustrates resource units for V2X or SL communication.

Referring to FIG. 8, the frequency resources of a resource pool may be divided into NF sets, and the time resources of the resource pool may be divided into NT sets. Accordingly, a total of NF*NT resource units may be defined in the resource pool. FIG. 8 shows an exemplary case where the resource pool is repeated with a periodicity of NT subframes.

As shown in FIG. 8, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Vehicular Communications for ITS

An intelligent transport system (ITS) utilizing vehicle-to-everything (V2X) may mainly include an access layer, a network & transport layer, a facilities layer, an application layer, security and management entities, etc. Vehicle communication may be applied to various scenarios such as vehicle-to-vehicle communication (V2V), vehicle-to-network communication (V2N or N2V), vehicle-to-road side unit (RSU) communication (V2I or I2V), RSU-to-RSU communication (I2I), vehicle-to-pedestrian communication (V2P or P2V), and RSU-to-pedestrian communication (I2P or P2I). A vehicle, a BS, an RSU, a pedestrian, etc. as the subjects of vehicle communication are referred to as ITS stations.

Figure 9:
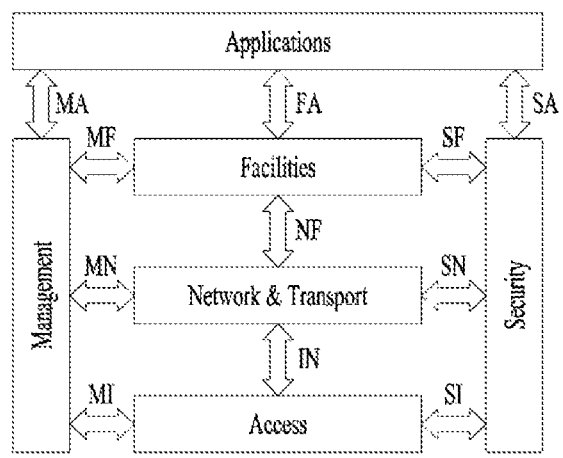
FIG. 9 is a diagram for explaining an ITS station reference architecture.

FIG. 9 is a diagram for explaining an ITS station reference architecture.

The ITS station reference architecture may include an access layer, a network & transport layer, a facilities layer, entities for security and management, and an application layer at the top. Basically, the ITS station reference architecture follows a layered OSI model.

Specifically, features of the ITS station reference architecture based on the OSI model are illustrated in FIG. 9. The access layer of the ITS station corresponds to OSI layer 1 (physical layer) and layer 2 (data link layer), the network & transport layer of the ITS station corresponds to OSI layer 3 (network layer) and layer 4 (transport layer), and the facilities layer of the ITS station corresponds to OSI layer 5 (session layer), layer 6 (presentation layer), and layer 7 (application layer).

The application layer, which is located at the highest layer of the ITS station, may actually implement and support a use-case and may be selectively used according to the use-case. The management entity serves to manage all layers in addition to managing communication and operations of the ITS station. The security entity provides security services for all layers. Each layer of the ITS station exchanges data transmitted or received through vehicle communication and additional information for various purposes through an interface. The abbreviations of various interfaces are described below.

MA: Interface between management entity and application layer

MF: Interface between management entity and facilities layer

MN: Interface between management entity and networking & transport layer

MI: Interface between management entity and access layer

FA: Interface between facilities layer and ITS-S applications

NF: Interface between networking & transport layer and facilities layer

IN: Interface between access layer and networking & transport layer

SA: Interface between security entity and ITS-S applications

SF: Interface between security entity and facilities layer

SN: Interface between security entity and networking & transport layer

SI: Interface between security entity and access layer

FIG. 10 illustrates an exemplary structure of an ITS station that may be designed and applied based on a reference architecture.

A main concept of the ITS station reference architecture is to allow each layer with a special function to process communication on a layer basis, between two end vehicles/users included in a communication network. That is, when a V2V message is generated, the data is passed through each layer downwards layer by layer in the vehicle and the ITS system (or other ITS-related UEs/systems), and a vehicle or ITS system (or other ITS-related UEs/systems) receiving the message passes the message upwards layer by layer.

The ITS system operating through vehicle communication and the network was organically designed in consideration of various access technologies, network protocols, communication interfaces, etc. to support various use-cases, and the roles and functions of each layer described below may be changed depending on a situation. The main functions of each layer will be briefly described.

The application later actually implements and supports various use-cases. For example, the application layer provides security, efficient traffic information, and other entertainment information.

The application layer controls an ITS station to which an application belongs in various manners or provides services by transferring a service message to an end vehicle/user/infrastructure through the access layer, the network & transport layer, and the facilities layer, which are lower layers of the application layer, by vehicle communication. In this case, the ITS application may support various use-cases. In general, these use-cases may be supported by grouping into other applications such as road-safety, traffic efficiency, local services, and infotainment. Application classification, use-cases, etc. may be updated when a new application scenario is defined. Layer management serves to manage and service information related to operation and security of the application layer, and the related information is transmitted and shared bidirectionally through an MA and an SA (or service access point (SAP), e.g. MA-SAP or SA-SAP). A request from the application layer to the facilities layer or a service message and related information from the facilities layer to the application layer may be delivered through an FA.

The facilities layer serves to support effective implementation of various use-cases defined in an application layer of a higher layer. For example, the facilities layer may perform application support, information support, and session/communication support.

The facilities layer basically supports the 3 higher layers of the OSI model, for example, a session layer, a presentation layer, and the application layer, and functions. Specifically, the facilities layer provides facilities such as application support, information support, and session/communication support, for the ITS. Here, the facilities mean components that provide functionality, information, and data.

The application support facilities support the operation of ITS applications (mainly generation of a message for the ITS, transmission and reception of the message to and from a lower layer, and management of the message). The application support facilities include a cooperative awareness (CA) basic service and a decentralized environmental notification (DEN) basic service. In the future, facilities entities for new services such as cooperative adaptive cruise control (CACC), platooning, a vulnerable roadside user (VRU), and a collective perception service (CPS), and related messages may be additionally defined.

The information support facilities provide common data information or a database to be used by various ITS applications and includes a local dynamic map (LDM).

The session/communication support facilities provide services for communications and session management and include an addressing mode and session support.

Facilities may be divided into common facilities and domain facilities.

The common facilities are facilities that provide common services or functions required for various ITS applications and ITS station operations, such as time management, position management, and service management.

The domain facilities are facilities that provide special services or functions required only for some (one or more) ITS applications, such as a DEN basic service for road hazard warning applications (RHW). The domain facilities are optional functions and are not used unless supported by the ITS station.

Layer management serves to manage and service information related to the operation and security of the facilities layer, and the related information is transmitted and shared bidirectionally through an MF and an SF (or MF-SAP and SF-SAP). The transfer of service messages and related information from the application layer to the facilities layer or from the facilities layer to the application layer is performed through an FA (or FA-SAP), and bidirectional service messages and related information between the facilities layer and the lower networking & transport layer are transmitted by an NF (or NF-SAP).

The network & transport layer servers to configure a network for vehicle communication between homogenous or heterogeneous networks through support of various transport protocols and network protocols. For example, the network & transport layer may provide Internet access, routing, and vehicle networking using Internet protocols such as TCP/UDP+IPv6 and form a vehicle network using a basic transport protocol (BTP) and GeoNetworking-based protocols. In this case, networking using geographic position information may also be supported. A vehicle network layer may be designed or configured depending on technology used for the access layer (access layer technology-independently) or regardless of the technology used for the access layer (access layer technology-independently or access layer technology agnostically).

Functionalities of the European ITS network & transport layer are as follows. Basically, functionalities of the ITS network & transport layer are similar to or identical to those of OSI layer 3 (network layer) and layer 4 (transport layer) and have the following characteristics.

Figure 11:
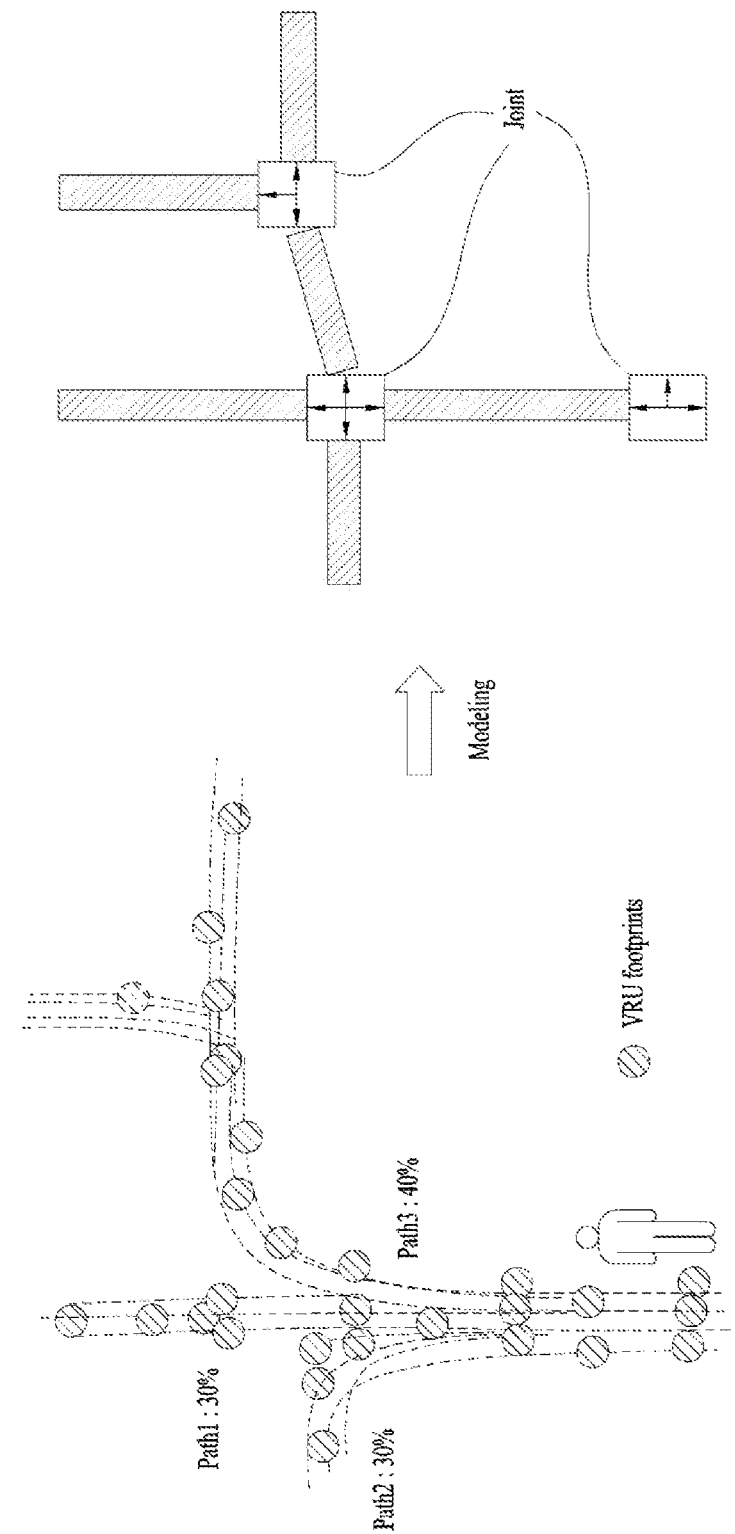
FIGS. 11 and 12 are diagrams for explaining a method of generating a VRU path map based on VRU messages of VRUs by a SoftV2X server of a SoftV2X system.

The transport layer is a connection layer that delivers service messages and related information received from higher layers (the session layer, the presentation layer, and the application layer) and lower layers (the network layer, the data link layer, and the physical layer). The transport layer serves to manage data transmitted by an application of the ITS station so that the data accurately arrives at an application process of the ITS station as a destination. Transport protocols that may be considered in European ITS include, for example, TCP and UDP used as legacy Internet protocols as illustrated in FIG. 11, and there are transport protocols only for the ITS, such as the BTS.

The network layer serves to determine a logical address and a packet forwarding method/path, and add information such as the logical address of a destination and the forwarding path/method to a header of the network layer in a packet received from the transport layer. As an example of the packet method, unicast, broadcast, and multicast between ITS stations may be considered. Various networking protocols for the ITS may be considered, such as GeoNetworking, IPv6 networking with mobility support, and IPv6 over GeoNetworking. In addition to simple packet transmission, the GeoNetworking protocol may apply various forwarding paths or transmission ranges, such as forwarding using position information about stations including vehicles or forwarding using the number of forwarding hops.

Layer management related to the network & transport layer serves to manage and provide information related to the operation and security of the network & transport layer, and the related information is transmitted and shared bidirectionally through an MN (or MN-SAP) and an SN (or SN-SAP). Transmission of bidirectional service messages and related information between the facilities layer and the networking & transport layer is performed by an NF (or NF-SAP), and service messages and related information between the networking & transport layer and the access layer are exchanged by an IN (or IN-SAP).

A North American ITS network & transport layer supports IPv6 and TCP/UDP to support existing IP data like Europe, and a wave short message protocol (WSMP) is defined as a protocol only for the ITS.

A packet structure of a wave short message (WSM) generated according to the WSMP includes a WSMP header and WSM data carrying a message. The WSMP header includes Version, PSID, WSMP header extension fields, WSM WAVE element ID, and Length.

Version is defined by a WsmpVersion field indicating an actual WSMP version of 4 bits and a reserved field of 4 bits. PSID is a provider service identifier, which is allocated according to an application in a higher layer and helps a receiver to determine an appropriate higher layer. Extension fields is a field for extending the WSMP header, and includes information such as a channel number, a data rate, and transmit power used. WSMP WAVE element ID specifies the type of a WSM to be transmitted. Length specifies the length of transmitted WSM data in octets through a WSMLength field of 12 bits, and the remaining 4 bits are reserved. LLC Header allows IP data and WSMP data to be transmitted separately and is distinguished by Ethertype of a SNAP. The structures of the LLC header and the SNAP header are defined in IEEE802.2. When IP data is transmitted, Ethertype is set to 0x86DD in the LLC header. When WSMP is transmitted, Ethertype is set to 0x88DC in the LLC header. The receiver identifies Ethertype. If Ethertype is 0x86DD, the receiver transmits upward the packet to an IP data path, and if Ethertype is 0x88DC, the receiver transmits upward the packet to a WSMP path.

The access layer serves to transmit a message or data received from a higher layer on a physical channel. As access layer technologies, ITS-G5 vehicle communication technology based on IEEE 802.11p, satellite/broadband wireless mobile communication technology, 2G/3G/4G (long-term evolution (LTE), etc.)/5G wireless cellular communication technology, cellular-V2X vehicle-dedicated communication technologies such as LTE-V2X and NR-V2X (new radio), broadband terrestrial digital broadcasting technology such as DVB-T/T2/ATSC3.0, and GPS technology may be applied.

A data link layer is a layer that converts a physical line between adjacent nodes (or between vehicles) with noise into a communication channel without transmission error, for use in the higher network layer. The data link layer performs a function of transmitting/delivering/forwarding L3 protocols, a framing function of dividing data to be transmitted into packets (or frames) as transmission units and grouping the packets, a flow control function of compensating for a speed difference between a transmitter and a receiver, and a function of (because there is a high probability that an error and noise occurs randomly in view of the nature of a physical transmission medium) detecting a transmission error and correcting the error or detecting a transmission error based on a timer and an ACK signal by a transmitter in a method such as automatic repeat request (ACK) and retransmitting a packet that has not been correctly received. In addition, to avoid confusion between packets or ACK signals, the data link layer performs a function of assigning a sequence number to the packets and the ACK signals, and a function of controlling establishment, maintenance, and disconnection of a data link between network entities, and data transmission between network entities. The main functions of logical link control (LLC), radio resource control (RRC), packet data convergence protocol (PDCP), radio link control (RLC), medium access control (MAC), and multi-channel operation (MCO) included in the data link layer of FIG. 11 will be described below.

An LLC sub-layer enables the use of different lower MAC sub-layer protocols, and thus enables communication regardless of network topology. An RRC sub-layer performs functions such as broadcasting of cell system information required for all UEs within a cell, management of delivery of paging messages, management (setup/maintenance/release) of RRC connection between a UE and an E-UTRAN, mobility management (handover), transmission of UE context between eNodeBs during handover, UE measurement reporting and control therefor, UE capability management, temporary assignment of a cell ID to a UE, security management including key management, and RRC message encryption. A PDCP sub-layer may performs functions such as IP packet header compression in a compression method such as robust header compression (ROHC), cyphering of a control message and user data, data integrity, and data loss prevention during handover. RLC sub-layer delivers a packet received from the higher PDCP layer in an allowed size of the MAC layer through packet segmentation/concatenation, increases data transmission reliability by transmission error and retransmission management, checks the order of received data, reorders data, and checks redundancy. A MAC sub-layer performs functions such as control of the occurrence of collision/contention between nodes for use of shared media among multiple nodes, matching a packet delivered from the higher layer to a physical layer frame format, assignment and identification of the address of the transmitter/receiver, detection of a carrier, collision detection, and detection of obstacles on the physical medium. An MCO sub-layer enables efficient provision of various services on a plurality of frequency channels. The main function of MCO sub-layer is to effectively distribute traffic load of a specific frequency channel to other channels to minimize collision/contention of communication information between vehicles in each frequency channel.

The physical layer is the lowest layer in the ITS layer architecture. The physical layer defines an interface between a node and a transmission medium and performs modulation, coding, and mapping of a transport channel to a physical channel, for bit transmission between data link layer entities and informs the MAC sub-layer of whether a wireless medium is busy or idle by carrier sensing or clear channel assessment (CCA).

A SoftV2X system may be a system in which a SoftV2X server receives a VRU message or a personal safety message (PSM) from a vulnerable road user (VRU) or a V2X vehicle and transfers information on a neighbor VRU or vehicle based on the VRU message or the PSM message or may analyze a road condition, etc. on which neighbor VRUs or vehicles move and may transmit a message informing a neighbor VRU or vehicle of a collision warning, etc. based on the analyzed information (e.g., through a downlink signal) via V2X communication using a UU interface. Here, the VRU message may be a message transmitted to the SoftV2X server through the UU interface, and may include mobility information about the VRU, such as a position, a movement direction, a movement path, and a speed of the VRU. That is, the SoftV2X system may use a method of receiving mobility information of VRUs and/or vehicles related to V2X communication through the UU interface and controlling a driving route or a VRU movement flow of the VRU, etc. based on the mobility information received by the softV2X server, such as a network. The SoftV2X system may be configured in relation to V2N communication.

User equipment or pedestrian equipment (VRU device) that is difficult to perform direct communication (PC5, DSRC) related to V2X communication can provide or receive driving information and mobility information to nearby vehicles or VRUs through the SoftV2X system based on the UU interface. Through this, the user equipment or pedestrian equipment (VRU device) that is difficult to perform the direct communication (PC5, DSRC) can be protected from surrounding vehicles.

Hereinafter, a method in which the SoftV2X server generates a VRU path map useful for predicting paths of the VRUs and provides the generated VRU path map in the SoftV2X system will be described in detail.

Creation of VRU Stochastic Path Through Analysis of PSM Path History

Existing vehicles may use road map information MAP to further help V2X communication, but VRUs are not provided with map information corresponding to a sidewalk on which they mainly travels, and thus may not receive help from map information to predict the movement route. In this regard, it may be necessary to digitize a path that a pedestrian device, VRU, is capable of traveling.

Figure 12:
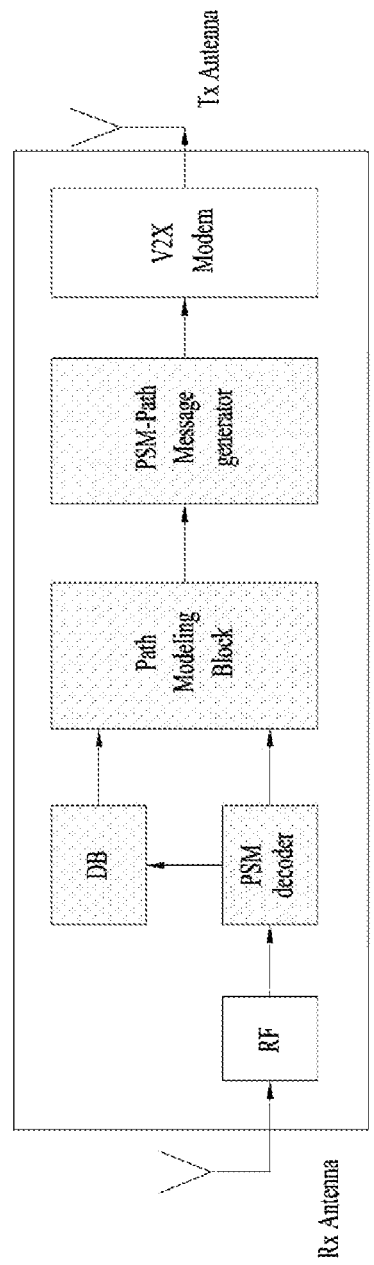

FIGS. 11 and 12 are diagrams for explaining a method of generating a VRU path map based on VRU messages of VRUs by a SoftV2X server of a SoftV2X system.

Referring to FIG. 11, a SoftV2X server of a SoftV2X system may collect data (or path data) transmitted by VRUs, may analyze the collected data, and may digitize a VRU path. VRUs that travel on a predetermined road or sidewalk may periodically transfer a message of the VRU to the SoftV2X server through P2N. An interface for transmitting the VRU message may include P2I as well as P2N, and the SoftV2X server may be changed to an RSU in the case of P2I. The SoftV2X server may collect path data of each of the VRUs based on mobility information included in a PSM or VRU message transmitted from the VRUs and may estimate a path on which the VRU is capable of traveling through the collected path data. The SoftV2X server may generate a VRU path map based on the collected path data.

Referring to FIG. 12, the SoftV2X server may include an RF antenna block, a PSM (or VRU message) decoder block, a database (DB) block, a path modeling block, a PSM (or VRU) path message generation block, a V2X modem block (and/or a UU interface block). The RF antenna block may receive a VRU message (PSM). The PSM decoder or PSM decoder block may decode the received PSM (or VRU message) and may extract path information related to a path of the VRU. The DB may receive path information extracted from the PSM decoder block and may store the movement path of VRUs.

Then, the path modeling block may analyze the path information. In detail, the path modeling block may collect interpolated values based on paths configured as a sample and may determine or determine information on a width of a node and stochastic information of a joint using the collected interpolated values. The PSM (or VRU) path message generation block may generate a VRU path map corresponding to the configuration of the PSM-path message or VRU-path message, and the V2X modem or the UU interface may transmit the generated VRU path map.

Hereinafter, a method of determining a VRU movement path and a joint based on VRU path data collected by the path modeling block or the SoftV2X server will be described in detail.

Figure 14:
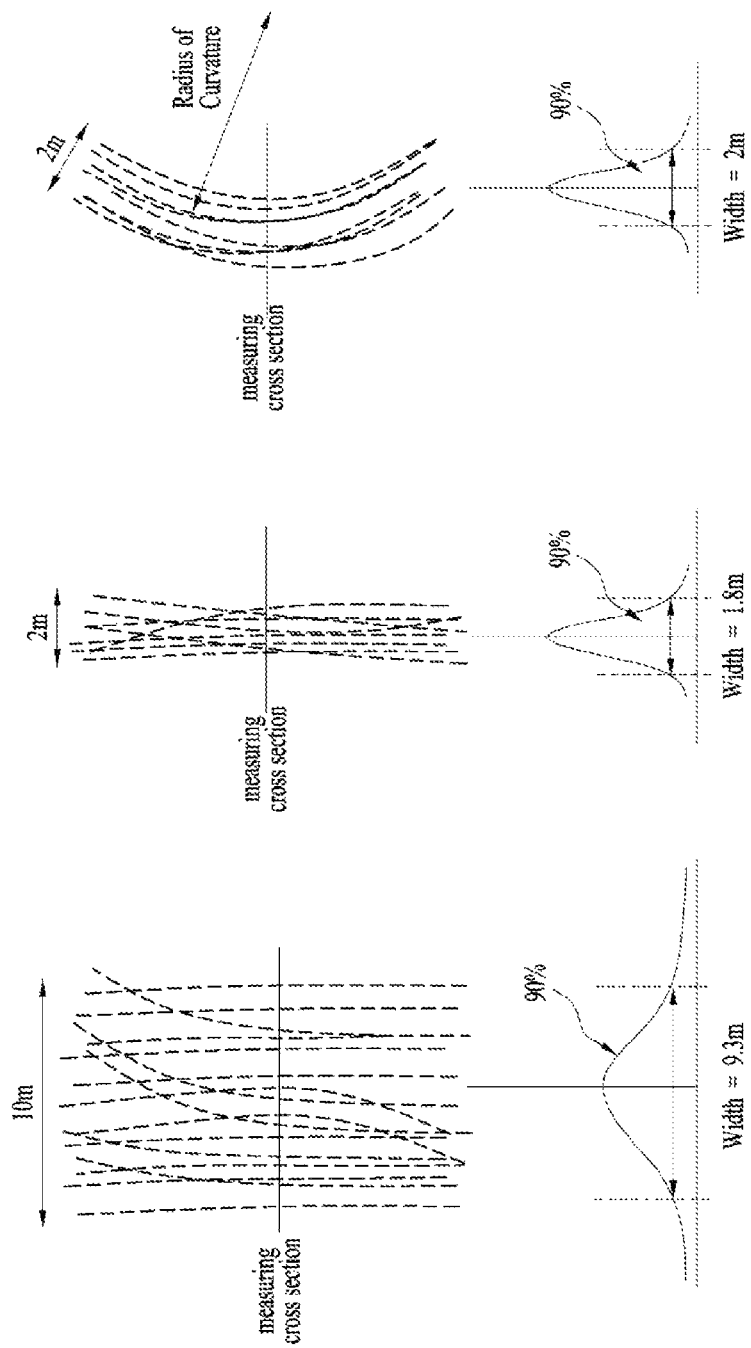

FIGS. 13 and 14 are diagrams for explaining a method of modeling a VRU path by a SoftV2X server.

Referring to FIG. 13, the SoftV2X server may determine a plurality of nodes and a plurality of joints based on path data of the collected VRU paths and may generate a VRU path map based on the determined plurality of nodes and plurality of joints.

The node may include two joints at both ends and paths. In detail, referring to FIG. 13, the node may include a joint A and a joint B at both ends, and may include a path AB and a path BA, which connect the joint A and the joint B. The path AB may be defined as a path toward the joint B from the joint A, and the path BA may be defined as a path toward the joint A from the joint B. The joint may provide information on at least one other path as a next path from an entrance path. That is, the joint may be a point from which at least two paths are branched.

The joint or information on the joint may include information on a path ID of a branched (or connected) path, an angle of the path, and a probability of traveling on a path. The angle of the path may be an angle measured in a clockwise direction based on a predetermined direction (e.g., a north direction). The probability of traveling on a path may be expressed through a percentage value of a probability of traveling on a corresponding path from a path on which previous VRUs travel.

In other words, the probability of traveling on a path may be calculated through a cumulative number of traveling on paths branched from the joint and a number of times of traveling on each path based on previously received paths (or path data acquired from a plurality of VRU messages) of VRUs. For example, when a first path, a second path, and a third path are branched from the joint A, a cumulative number of VRUs passing through the joint A is 10, a number of traveling on the first path is 2, a number of traveling on the second path is 3, and a number of traveling on the third path is 5, a probability of traveling on the first path may be calculated or defined as 20%, a probability of traveling on the second path may be calculated or defined as 30%, and a probability of traveling on the third path may be calculated or defined as 50%.

The path map may include additional information for respective paths in relation to the node. In detail, information related to the node may include AvrVelocity, RadiousOfCurvature, pathWidth, and Event. The AvrVelocity may include information on an average speed of VRUs in a corresponding node. The RadiusOfCurvature may include information on a radius and/or curvature (or a curved surface of paths included in the node) related to a movement path of VRUs. Here, information on a bending direction depending on whether the curvature or the radius is negative or positive may be provided. For example, when a value corresponding to the curvature or the radius is negative, the movement path may be a curve curved in a left direction, and when the value corresponding to the curvature or the radius is positive, the movement path may be a curve curved in a right direction. Alternatively, when the curvature is set to the maximum value of 64,500, the movement path may be a straight line. The pathWidth may include information on the width of a path on which VRUs pass at the node.

Referring to FIG. 14, the pathWidth may not be measured using all paths, but may be determined by statistically analyzing paths on which VRUs pass. That is, the width of the path may be determined as the width of the path within a specific critical range based on an average or intermediate position (or mean value) of all the paths. In detail, the SoftV2X server may collect or accumulate information on movement paths of VRUs related to a predetermined path of the node, may calculate a normal distribution curve of movement paths of the accumulated VRUs, and may determine the maximum width of the movement path within a predetermined threshold variance value in the normal distribution curve as the pathWidth.

For example, as shown in FIG. 14, the SoftV2X server may calculate a main path (or a normal distribution function) based on an average value of the movement paths, and may determine the width of paths within 90% of the main path as the pathWidth. In the case of FIG. 14(a), a path width may be calculated to be 10 meters according to the paths of the VRUs, but when the path width is calculated for paths within a range of 90%, the path width may be 9.3 meters. In the case of FIG. 14(b) (e.g., narrow alleyway), a path width may be calculated to be 2 meters according to the paths of the VRUs, but when the path width is calculated for paths within a range of 90%, the path width may be 1.8 meters. In the case of a curved path as shown in FIG. 14C, the width of a cross-section thereof may be determined as the pathWidth.

In detail, the SoftV2X server (or RSU) may generate the VRU path map to contain parameters defined in Table 5 and/or Table 6. That is, the SoftV2X server (or RSU) may generate the VRU path map according to a configuration and format in Table 5 and/or Table 6 mutually defined with the VRU. The VRU path map may be configured in units of specific zones. The zone may include various paths, and the various paths may be defined as a combination of a plurality of nodes. In detail, referring to Table 5, the VRU path map (DF_PathMap) may include NodeList including ZoneIDs and Nodes. The node may be configured in the form of DF_Node.

TABLE 5

| ASN.1 Representation |
|---|
| DF_PathMap::= SEQUENCE { <br>    ZoneID                INTEGER  -- 16bit random num <br>    NodeList            SEQUENCE [1,100] = DF_Node <br> } |

The DF_Node may be configured as shown in Table 6. The DF_Node may include NodeID with a 16-bit random value to distinguish a node, ArgVelocity indicating an average speed of moving VRUs in the node, RadiusOfCuvature indicating a radius of a curved surface when a path of the node is curve, pathWidth indicating the width of the path, and Event indicating cases such as construction on the corresponding node or ice sheets. The DF_Node may further include information on the joint A and the joint B connected to other nodes at both ends of the node or from which a plurality of paths are branched. Information on each of the joint A and the joint B may include ID (JointAID, JointBID) for distinguishing a joint, and a joint position (JointPositionA, JointPositionB). The DF_PathLink may include information on PathABLint and PathBALink indicating the state in which the both joints are connected to another node, and may be generated up to 10 as many as the number of connected nodes. The PathABLink may include path information of a VRU travels to the joint B from the joint A, and the PathBALink may include path information of a VRU travels to the joint A from the joint B.

TABLE 6

| ASN.1 Representation |
|---|
| DF_Node ::= SEQUENCE { <br>   NodeID              INTEGER   -- 16bit random num <br>   AvgVelocity        INTEGER   -- 0.01 m/s unit, 0 is stop <br>   RadiusOfCurvature   INTEGER   -- 1m unit, 64500 is straight <br>   PathWidth          INTEGER   -- 0.1m unit <br>   Event   INTEGER   -- EventCode table <br>   JointAID           INTEGER   -- 16bit random num <br>   JointBID           INTEGER   -- 16bit random num <br>   JointPositionA DF_Location -- from J2935 <br>   JointPositionB DF_Location -- from J2935 <br>   PathABLink         SEQEUNCE [1, 10] = DF_PathLink <br>   PathBALink         SEQEUNCE [1, 10] = DF_PathLink <br> } |

As shown in Table 7, the DF_PathLink may include information on NodeID, NodeAngle indicating a direction in which a node is connected, and NodeStochastic indicating a probability of traveling on the connected node.

TABLE 7

ASN.1 Representation

```
DF_PathLink::= SEQUENCE {
    NodeID            INTEGER  -- 16bit random num
    NodeAngle         INTEGER  -- 1 degree unit
    NodeStochastic    INTEGER  -- 0~100, % unit
}
```

Figure 15:
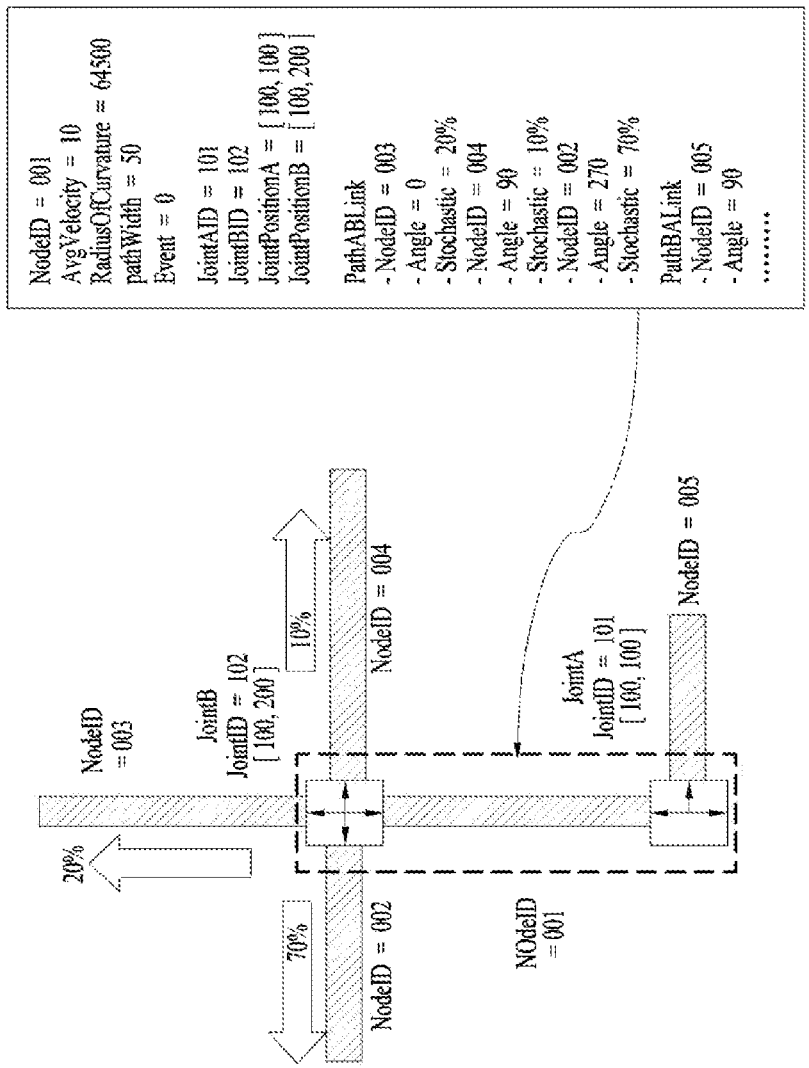
FIG. 15 is a diagram for explaining a method of generating a VRU path map based on DF_Node.

FIG. 15 is a diagram for explaining a method of generating a VRU path map based on DF_Node.

The SoftV2X server (or RSU) may analyze a VRU-path based on collected VRU path, may determine values of the DF_Node shown in Tables 5 to 7 based on the analyzed VRU-path, and may generate a message including the determined value of the DF_Node.

For example, referring to FIG. 15, the DF_Node may include information on a node with NodeID of 001. The node may be configured with ArgVelocity of 10 (i.e., a VRU moves at 0.1 meter/s), RadiusOfCuvature of 64,500 (a path being a straight line), a Path width of 50 (i.e., a path width is 5 meters), and Event of 0 (i.e., no event).

The DF_Node may include information on joints at both ends of a node. For example, the joint A may include JointID of 101 and a position of [100,100], and the joint B may include JointID of 102 and a position of [100,200]. Here, a path of a VRU may correspond to a line connecting positions of the two joints (the joint A and the joint B).

Then, a path connected from each joint (the joint A or the joint B) may be configured through PathABLink and/or PathBALink. A movement path of a VRU that travels or moves to the joint B from the joint A may have three movement paths branched from the joint B. The three movement paths may include a first path connected to a node with NodeID of 2, a second path connected to a node with NodeID of 3, and a third path connected to a node with NodeID of 4. For the first path, a direction of an angle of 270 degrees (west direction) and probability information of 70% may be configured. For the second path, a direction of an angle of 0 (north direction) and probability information of 20% may be configured. For the third path, a direction of an angle of 90 degrees (west direction) and probability information of 10% may be configured. Here, a probability for the third path may be 10% and a probability for the first path may be 70%, and thus it may be seen that the VRU frequently travels on the first path from the joint B and that the third path is a path on which the VRU does not frequently travel. PathBA may include information on a path toward the joint A from the joint B, and may include information on a node with NodeID of 005.

Figure 16:
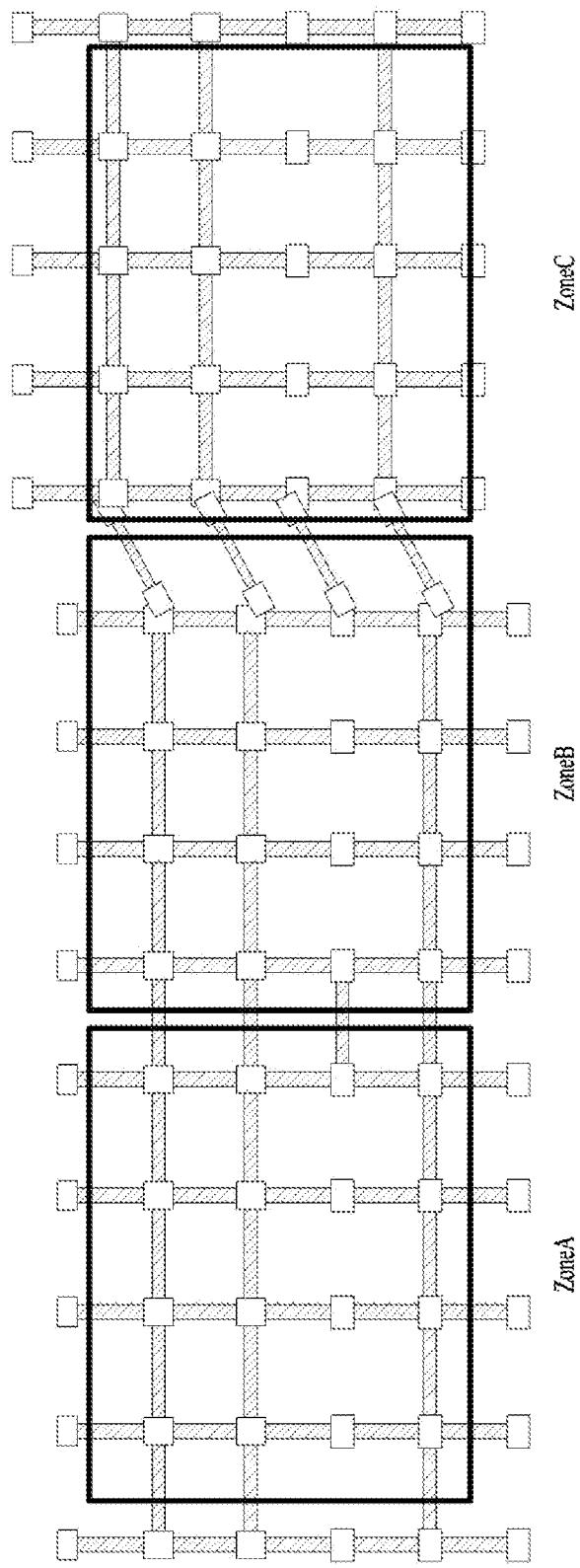
FIGS. 16 and 17 are diagrams for explaining a method of providing information on a VRU path map based on a zone ID.
Figure 17:
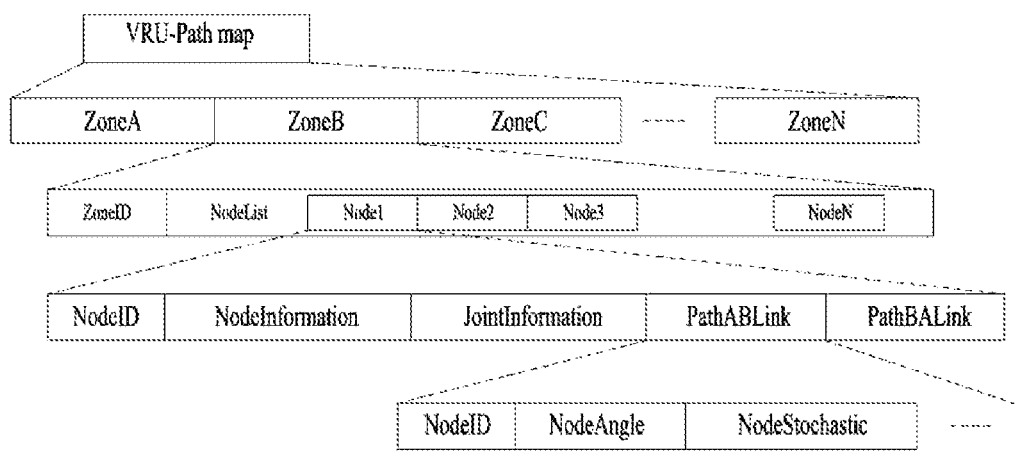

FIGS. 16 and 17 are diagrams for explaining a method of providing information on a VRU path map based on a zone ID.

As described above with reference to the drawings, the SoftV2X server may acquire path data about movement paths on which VRUs pass based on the collected VRU messages of the VRUs. The SoftV2X server may determine a node and a joint based on the path data, and may configure node information corresponding to the determined node and joint information corresponding to a joint to generate a VRU path map. In addition, the VRU path map may be configured for each zone.

Referring to FIG. 16, the SoftV2X server may configure or generate the aforementioned VRU path map for each zone.

In detail, the SoftV2X server may collect information on movement paths of VRUs for each zone, may determine a joint and a node for each zone based on the collected information on movement paths of the VRUs, and may configure information on the determined joint and node to generate a VRU path map for each zone. Here, the plurality of zones may be divided in advance based on a specific width, and the SoftV2X server may determine corresponding zones based on latitude and longitude, and may generate a corresponding VRU path map for each determined zone. In addition, a corresponding zoneID may be preset for each of the plurality of zones. Alternatively, the plurality of zones may be divided in advance so that some areas overlap.

Referring to FIG. 17, the SoftV2X server or the RSU may generate a VRU path map that provides information about nodes for each zone. The VRU path map may include a corresponding zone ID for each zone and information on nodes, and each of the nodes may include a node ID, node information, joint information, and path information. The path information may include information on a related node ID, an angle at a joint NodeAngle, a travelling probability (NodeStochastic), and the like. The VRU path map may include information on joints and node information about a connection relationship between the joints.

As described above, the SoftV2X server or the RSU may receive PSM messages transmitted from the VRUs, may analyze or collect paths on which the VRUs pass based on the received PSMs, and may generate a VRU path map including information on paths on which the VRUs are capable of traveling based on the collected or analyzed paths. In this case, the VRUs that receive the VRU-path map may effectively predict movement paths of the VRUs based on the VRU path map, and thus the VRU path map may help in generating a VRU traveling algorithm in the VRUs, and a vehicle may also receive the VRU path map and may effectively perform an operation for protecting the VRU based on a path on which the VRUs mainly move and a moving probability of the VRUs.

As such, the SoftV2X server (or RSU) may extract movement paths of VRUs based on information received from the VRUs, and may generate a VRU path map including node information and/or information on a joint based on the extracted movement path of the VRUs. The SoftV2X server (or RSU) may transmit the VRU path map generated to predict at least one path by the VRUs based on the VRU path map to the VRUs, thereby largely improving performance of path prediction of the VRUs.

Hereinafter, a method of predicting a path by a VRU based on the VRU path map and transmitting a VRU message including the predicted path will be described.

Configuration of PSM Message for Expressing VRU Path

In order to protect or a VRU, information on the state of a VRU device and/or a V2X device may be periodically provided to a neighbor device, the VRU device and/or the V2X device. A message transmitted by the VRU device and/or the V2X device may be a PSM or a VAM, the PSM and/or the VAM may include mobility information such as the position, movement speed, and direction of the device, and may further include past mobility information of the device and information on PathHistory and PethPrediction that are future predicted mobility information. Here, the PethPrediction may use the definition of a basic safety message (BSM) of the PathPrediction transmitted from a vehicle, etc. without change, but may not be suitable for expressing the state of a VRU having various movement paths without certain direction.

Hereinafter, a new PathPrediction DF configuration suitable for a VRU situation or state will be proposed. In addition, a method in which VRU devices share paths using a PSM of the newly defined DF configuration to perform safer traveling or driving will be proposed.

Figure 18:
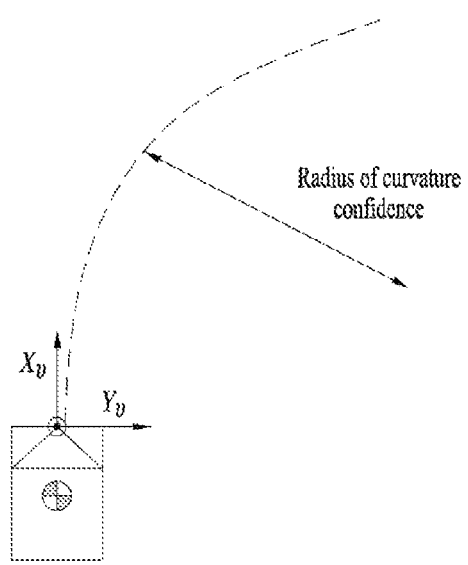
FIGS. 18 and 19 are diagrams for explaining a method of a prediction path of a VRU.
Figure 19:
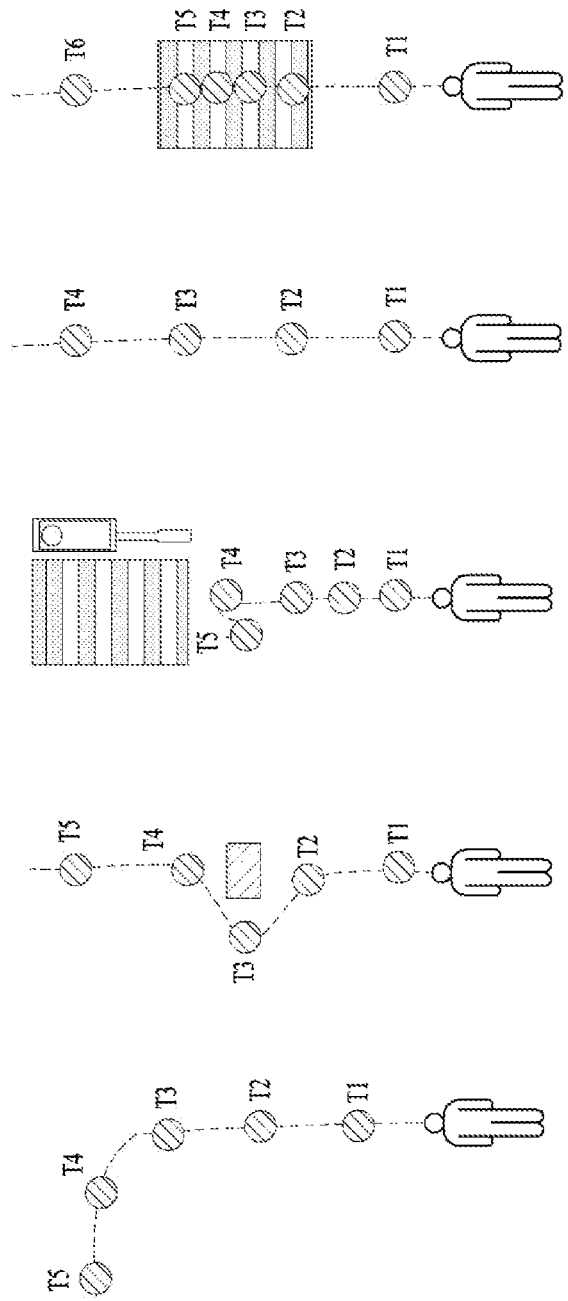

FIGS. 18 and 19 are diagrams for explaining a method of a prediction path of a VRU.

Referring to FIG. 18, a prediction path or VRU path of the VRU (DF_PathPrediction may be represented by 'radiousOfCurve' and 'Confidence', which indicate a direction in which the VRU travels in a curved surface.

In detail, the VRU message may be configured in such a way that mandatory data such as the state of the VRU (Position, accuracy, speed, and heading), path additional information (PathHistory, and pathPrediction), and VRU additional state information (UseState, Propulsion, Cluster size, and attachment) are optionally present as shown in Table 8.

TABLE 8

| Object Type | Description | Mandatory/Optional |
|---|---|---|
| basicType | PersonalDeviceUserType | Mandatory |
| secMark | DSecond | Mandatory |
| msgCnt | MsgCount | Mandatory |
| id | TemporaryID | Mandatory |
| position | Position3D, -Lat, Long, Elevation | Mandatory |
| accuracy | PositionalAccuracy | Mandatory |
| speed | Velocity | Mandatory |
| heading | Heading | Mandatory |
| accelSet | AccelerationSet4way | Optional |
| pathHistory | PathHistory | Optional |
| pathPrediction | PathPrediction | Optional |
| propulsion | Propelledinformation | Optional |
| useState | PersonalDeviceUsageState | Optional |
| crossRequest | PersonalCrossingRequest | Optional |
| crossState | PersonalCrossingInProgress | Optional |
| clusterSize | NumberOfparticipantIncluster | Optional |
| clusterRadius | PersonalClusterRadius | Optional |
| eventResonderType | PublicsSafetyEventResponderWakerType | Optional |
| activityType | PublicSafetyAndRoadWorkerActivity | Optional |
| activitySubType | PublicSafetyDirectingTrafficsubType | Optional |
| assistType | PersonalAssistive | Optional |
| sizing | UserSizeAndBehaviour | Optional |
| attachment | Attachment | Optional |
| attachmentRadius | AttachmentRadius | Optional |
| animalType | AnimalType | Optional |
| RegionalExtension | REGIONReg-PersonalSafetyMessage | Optional |

In particular, the PathPrediction for expressing the prediction path of the VRU may perform a function of predicting a path of a VRU by the VRU transmitting a message and notifying a neighbor vehicle or the VRU of the predicted path, and DF_pathPrediction may be configured as shown in Table 9 below.

TABLE 9

| ASN.1 Representation |
|---|
| PathPrediction ::= SEQUENCE { <br>    radiusOfCurve   RadiusOfCurvature, <br>    confidence   Confidence <br> } |

Referring to Table 9, the DF_PathPrediction may include 'radiousOfCurve' and 'Confidence' that indicate a direction in which the VRU travels in a curved surface. The radiousOfCurve may be set to at least one integer value between −32767 to 32767. Here, the radiousOfCurve may include a value related to a direction of the curved surface and a radius of the curved surface. For example, a value of the radiousOfCurve may be a length of the radius, may have a unit of 10 cm, and may indicate a direction in which the curved surface is directed according to whether the value is a negative value or a positive value (or a sign). Alternatively, when the path of the VRU is a straight forward path, the radiousOfCurve may be set to 32,767. The 'Confidence' may be a value indicating a probability of traveling on a path corresponding to the DF_PathPrediction. When the probability of traveling on the path is high, the 'Confidence' may be set to a high value, and when a probability of deviation from the path is high, the Confidence' may be set to a value less than a predetermined threshold to induce response from neighbor vehicles.

Here, a value of the PathPrediction of the VRU may use definition of the PathPrediction of the BSM without change. However, the PathPrediction of the BSM may have a value defined based on a direction in which a vehicle travels and a radius of a curvature calculated through a steering handle and may not be suitable for the VRU. That is, the definition of the PathPrediction for the existing BSM may not be suitable for expressing the VRU path. For example, the VRU may not be ensured to move along a curved surface, and may move in various paths, such as turning a direction at a right angle or making a U-turn from the same place and returning. This movement may be difficult to express only with a radius of curvature. Accordingly, it may be necessary to define a method of expressing a VRU path suitable for the VRU.

Referring to FIG. 19, a VRU path may be represented in a path of (a) to (e).

The path of FIG. 19(a) may correspond to the case in which a VRU changes a path by 90 or more for visiting an alleyway or a shopping mall. The path of FIG. 19(b) may correspond to the case in which the VRU avoids a specific obstacle according to a situation of a pedestrian path. The path of FIG. 19(c) may correspond to the case in which the VRU stops by a traffic light. The path of FIG. 19(d) may correspond to the case in which the VRU travels at constant speed, and the path of FIG. 19(e) may correspond to the case in which the VRU moves slowly on a predetermined path such as a crosswalk. In particular, it may be difficult to distinguish the cases of FIGS. 19 (d) and 19 (e) only with the curvature expression.

It may be required to define new DF_PathPrediction for expressing various paths of a VRU. For example, a value of the PathPrediction may be represented by a position value predicted after a certain time rather than a conventional curvature.

In detail, the PathPrediction (ASN.1) may be represented or defined as shown in Table 10 and/or Table 11. The PathPrediction may be defined as a parameter of PathPointList may be defined as parameters of PathPointList for a sequence, TimeInterval for the specific time, and confidence for a predicted position of the VRU that exists after a specific time interval. In other words, the PathPrediction may be defined as a sequence of predicted positions according to a specific time interval. The PathPointList may represent the position of the VRU in the form of a sequence through latitude and longitude. Here, as shown in Table 11, the sequence format may use the OffsetLL-B18 format, which is represented as a difference value between latitude and longitude from a reference position. For example, the OffsetLL-B18 format may be a data expression method in which only 18 bits from the LSB of the position values are shown and a difference point at the first position is expressed.

TABLE 10

ASN.1 Representation

DF_PathPrediction ::= SEQUENCE {
  PathPointList SEQUENCE (SIZE(1..23)) OF PathPointList
  TimeInterval       Time
  confidence         Confidence
}

TABLE 11

ASN.1 Representation

DF_PathPointList::= SEQUENCE {
  PathLatOffset OffsetLL-B18
  PathLonOffset OffsetLL-B18
}

Hereinafter, the description will be given under the assumption that the VRU message includes information on a VRU path represented in a sequence type.

Figure 20:
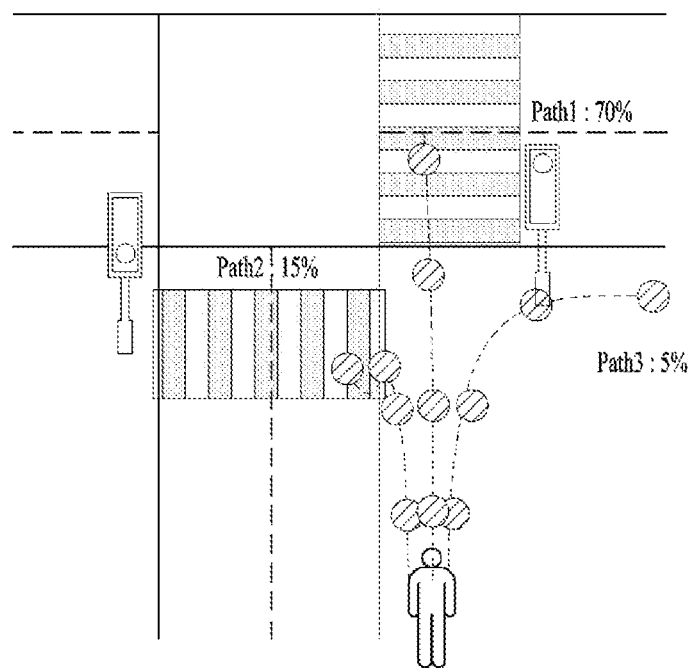
FIG. 20 is a diagram for explaining a VRU message including information on a plurality of VRU paths.

FIG. 20 is a diagram for explaining a VRU message including information on a plurality of VRU paths.

As described above, the PathPrediction may be represented in a sequence for positions at a specific time interval, the PathPrediction may include information on a plurality of VRU paths instead of one VRU path. For example, as for the movement path of the VRU, various paths such as a change of a path due to a traffic light or a change of a path for entering a building such as a shopping mall may be predicted. As such, various movement paths may be predicted differently for a VRU path than a vehicle, and thus unlike a conventional PathPrediction, PathPrediction for the VRU may be configured to include information on a plurality of VRU paths. When a neighbor vehicle or a neighbor VRU device receives a VRU message including the plurality of VRU paths, the neighbor vehicle or the neighbor VRU device may predict and respond to a changeable VRU path in advance in a crisis situation.

Referring to FIG. 20, the VRU may predict a plurality of VRU paths based on a road situation. For example, when the VRU enters an intersection, a path for the VRU may be basically predicted as a VRU path on which the VRU crosses a road straight ahead by seeing a green light, a VRU path on which the VRU waits to move to another path (Path2) depending on a signal condition, and a VRU path on which the VRU turns right without crossing a crosswalk. As such, when a plurality of VRU paths is predicted, the VRU may transmit a PSM including all of the plurality of VRU paths. A neighbor VRU or a neighbor vehicle may predict in advance various paths on which the VRU is capable of moving through the PSM.

As described above, in order to predict a plurality of VRU paths, DE present in an Optional Field of the PSM may be changed to MultiPathPrediction from the existing PathPrediction. The MultiPathPrediction may include MutiPathID, MultiPathPointList, and MultiPathExpection as shown in Table 12 below. Here, the MultiPathID may be a unique number of each VRU path, the MultiPathPointList may be a sequence (SECUENCE) of the previously proposed PathPointList, and MultiPathExpectation may be a value indicating a predicted probability of traveling on each path. The MultiPathPointList may partially include a path as a curvature as in the existing method.

TABLE 12

ASN.1 Representation

DF_MultiPathPrediction ::= SEQUENCE {
  MultiPathID        SEQUENCE (SIZE(1..5)) OF INTEGER
  MultiPathPointList    SEQUENCE (SIZE(1..5)) OF PathPrediction
  MultiPathExpectation  SEQUENCE (SIZE(1..5)) OF INTEGER
}

Alternatively, the VRU may predict the various paths based on the VRU path map transmitted from the SoftV2X server described with reference to FIGS. 11 to 17.

In detail, the VRU path map may include information on the position of a joint from which two or more paths are branched, probability information for each of the two or more paths, and path information about a movement path formed between two joints based on the determined joint. In the VRU path map, the joint information and the path information may be differentiated for each zone ID. In this case, the VRU may determine a corresponding zone ID based on the longitude and latitude of the position of the VRU, and may extract joint information and path information corresponding to the zone ID determined from the VRU path map. The VRU may determine at least one movement path and probability information for each movement path based on the extracted joint information and path information. For example, the VRU may determine a joint related to a movement path of the VRU from the joint information based on a traveling direction and position information of the VRU (or heading direction) and may determine the at least one movement path for predicting two more paths branched from the joint. In addition, a path curvature, a path width, or the like for at least one movement path may be determined based on the path information. In addition, the VRU may determine a probability for each of the at least one movement path based on probability information related to the determined joint.

FIGS. 21 to 24 are diagrams for explaining management method of a PSM including the plurality of VRU paths.

Figure 21:
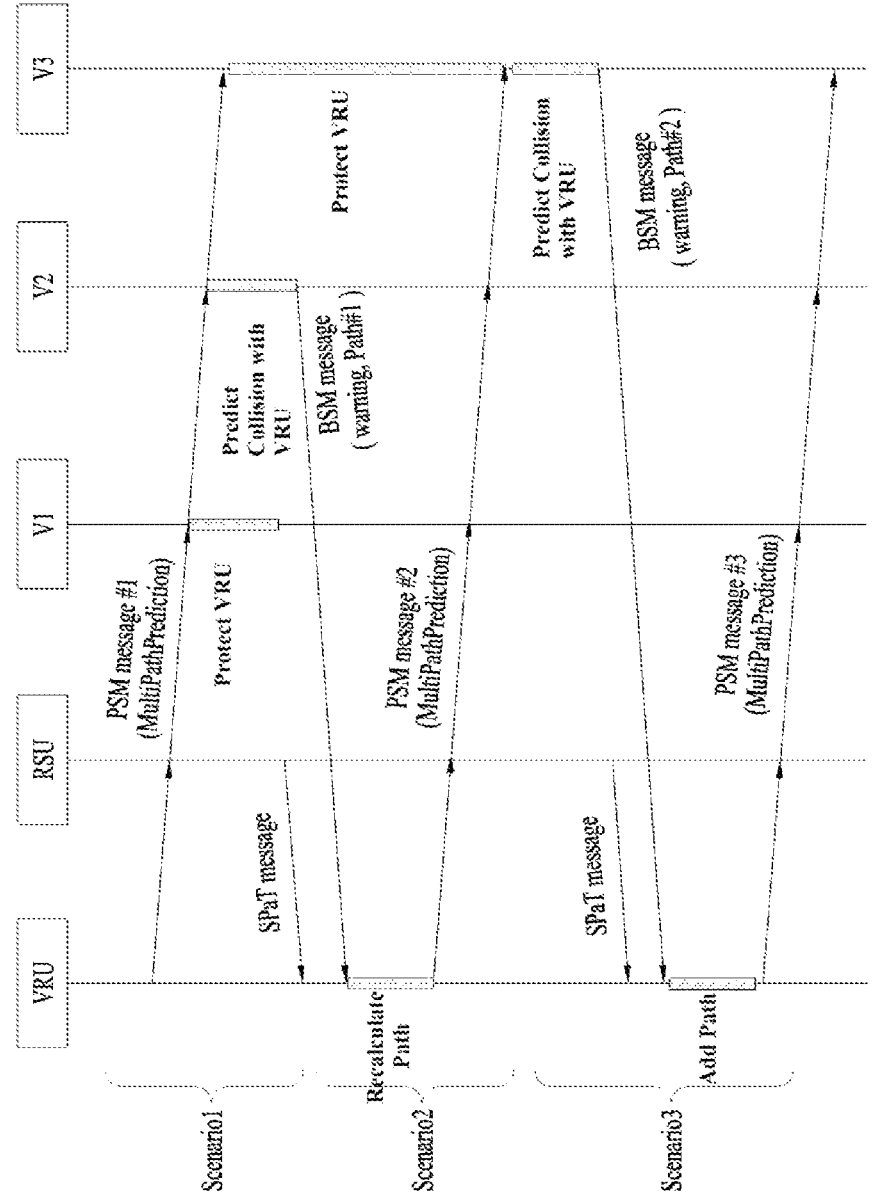
FIGS. 21 to 24 are diagrams for explaining management method of a PSM including the plurality of VRU paths.

Referring to FIG. 21, when a VRU enters an intersection and is capable of crossing two crosswalks, the VRU may transmit a first PSM PSM #1 including information on a plurality of VRU paths related to the crosswalks. That is, the first PSM may include information on a plurality of VRU paths and probability information on each of the plurality of VRU paths.

Figure 22:
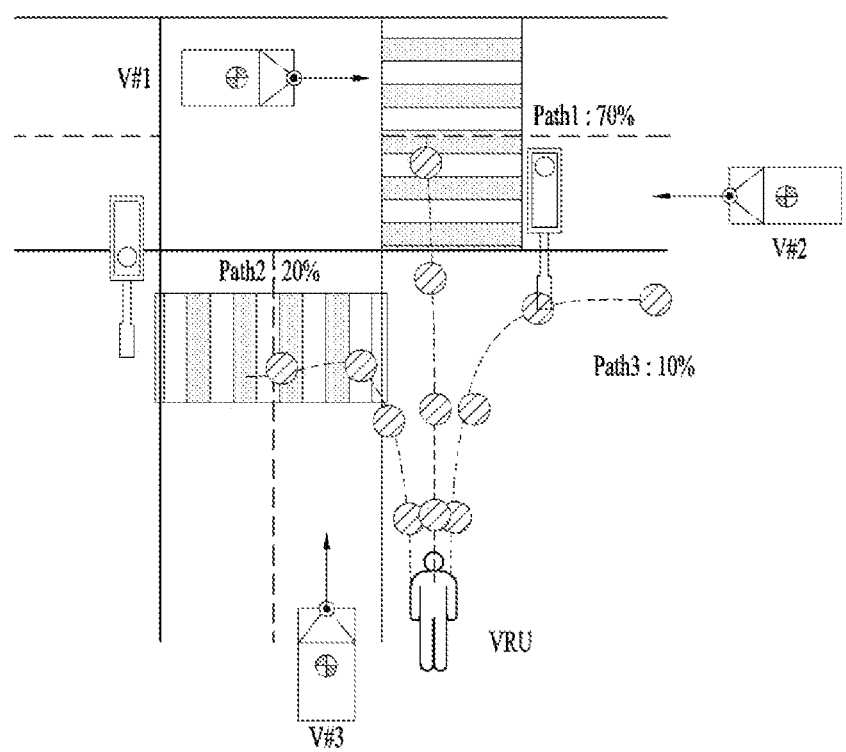

In detail, referring to FIG. 22, The VRU may intend to cross a road through a first VRU path (path1) and may transmit a first PSM including information on a plurality of VRU paths of the first VRU path (path1), the second VRU path (path2), and the third VRU path (path3) (MultiPathPrediction). The first PSM may further include probability information of 70%, 20%, and 10% which are respectively calculated for the first VRU path (path1), the second VRU path (path2), and the third VRU path (path3). In this case, a first vehicle V1 and a third vehicle V3 that receive the first PSM may keep traveling in that a traffic light related to a travelling direction is still in a driving signal and collision with the VRU is not predicted. When the VRU moves along the existing first VRU path, a second vehicle V2 that enters the crosswalk later than the first vehicle V1 may be recognized to have a high collision probability with the VRU based on the first PSM, and the VRU may be informed of risk information that there is a collision probability at a specific time in relation to the first VRU path (Scenario 1 of FIG. 21). Here, the second vehicle may transfer the risk information to the VRU through CAM extension, VRU trajectory interception indicator (TII), and/or a BSM. The RSU that receives the first PSM may transmit a Signal Phase and Timing (SPaT) message to the VRU.

Alternatively, the third vehicle may determine that a collision probability with the VRU is not high based on information (20%) on a probability that the VRU moves along the second VRU path from the first PSM and may perform an operation for preparing for collision with the VRU even if a separate warning message is not transmitted. In contrast, the existing PSM may include only information on one VRU path (e.g., the first VRU path), and thus the third vehicle may not expect that the VRU is capable of entering the second VRU path at all.

Figure 23:
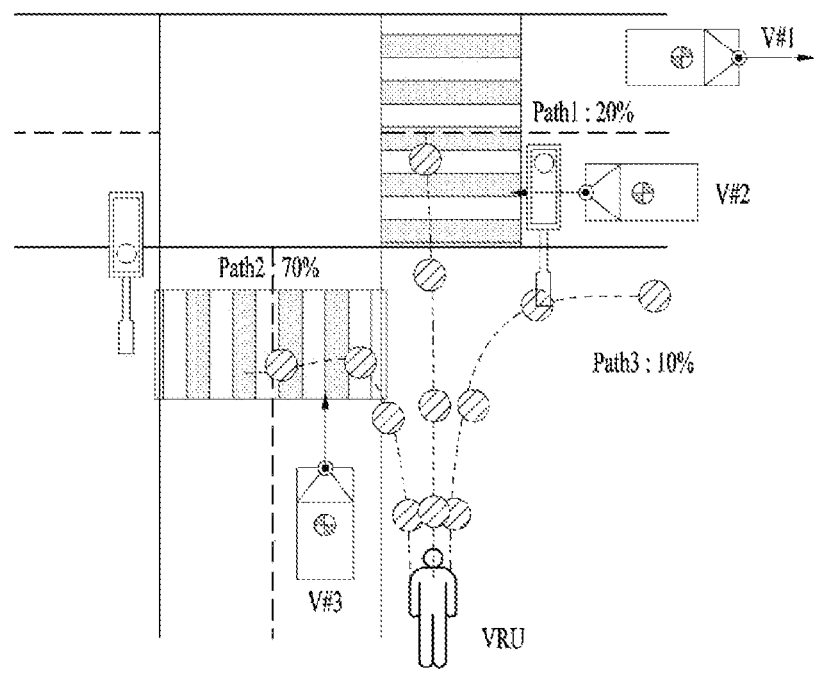

Then, referring to FIG. 23, the VRU may recalculate the VRU path based on the risk information and the SPaT message that are received from the second vehicle and may update information on the plurality of VRU paths (MultiPathPrediction value). The VRU may transmit a second PSM (PSM #2) including information on the updated plurality of VRU paths. For example, when the existing first VRU path, second VRU path, and third VRU path are not changed and only information on the probabilities is changed (Path1: 20%, Path2: 70%, and Path3: 10%), the VRU may rapidly update only information on the probability from the MultiPathPrediction. When the paths are not changed and only the probabilities are changed, only the probabilities may be rapidly updated. That is, a new MultiPathPrediction value may be updated through the PSM message (Scenario 2).

Figure 24:
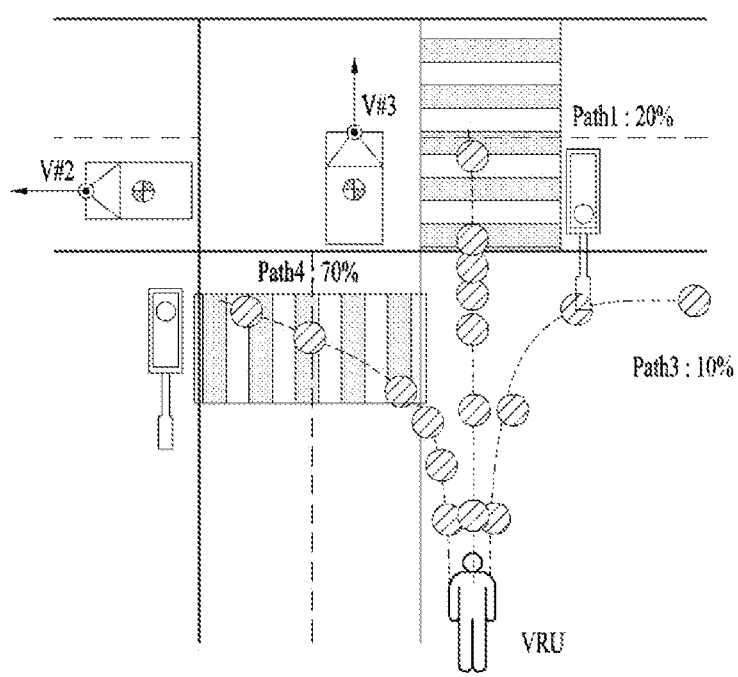

Then, referring to FIG. 24, both the second vehicle V2 and the third vehicle V3 may deviate from the VRU paths. When the VRU waits for a signal of a traffic light related to the second path to change and then tries to cross a crosswalk (i.e., movement along the fourth path (path4)), the VRU may newly update and transmit a MultiPathPrediction value of the PSM according to a new state change (or strategy). For example, the VRU may update information on a probability, may delete the existing second path, and may add the fourth path according to a situation of a traffic light for the first path.

As described above, the VRU may express a VRU path thereof using a method of PathPrediction that is newly defined using a different method from PathPrediction defined in the existing PSM configuration, and may provide information on various VRU path to be predicted based on a probability through introduction of the MultiPathPrediction to a neighbor VRU or neighbor vehicles. In this case, the neighbor VRU or the neighbor vehicles may more effectively predict and manage movement paths move the VRU based on the plurality of VRU paths.

Figure 25:
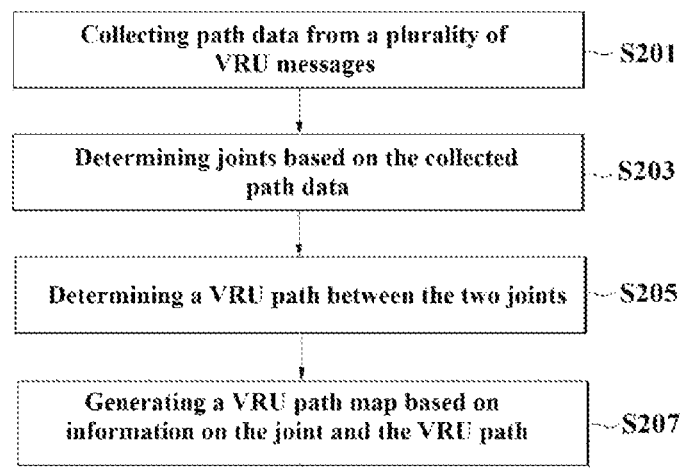
FIG. 25 is a diagram for explaining a method of generating a VRU path map by a SoftV2X server.

FIG. 25 is a diagram for explaining a method of generating a VRU path map by a SoftV2X server.

The SoftV2X server may receive a plurality of VRU messages from a plurality of VRUs. Conventionally, the SoftV2X server may perform only an operation of retransmitting the received plurality of VRU messages through downlink or transmitting a message for protecting a VRU detected to be at risk based on the plurality of VRU messages. In contrast, the proposed SoftV2X server may continuously collect mobility information of the VRU included in the collected plurality of VRU messages and may generate a VRU path map related to the plurality of VRUs based on the collected mobility information.

Referring to FIG. 25, the SoftV2X server may collect path data related to a plurality of VRUs from the received plurality of VRU messages (S201). Each of the plurality of VRU messages may include mobility information on the VRU and/or path data related to the movement path. As shown in FIG. 19, the path data may include sequence information indicating positions of the VRU at a predetermined time interval.

In this case, the SoftV2X server may acquire path data related to the movement path of the plurality of VRUs from the received plurality of VRU messages. The path data may include mobility information on a position value, a moving speed, and a traveling direction of each of the plurality of VRUs.

Then, the SoftV2X server may determine joints from which two or more VRU paths are branched based on the path data (S203). That is, the SoftV2X server may specify a position and area from which a travel direction of the VRU is branched based on the path data, and may determine the specified position and area as a joint or a joint area. In this case, as described above with reference to FIGS. 11 to 14, the SoftV2X server may determine an angle and a probability for each of the plurality of VRU paths branched from the determined joint or joint area based on the path data, and may generate the determined angle and probability as joint information about the joint or the joint area.

In detail, the SoftV2X server may determine a branch point or a branch area at which travel directions of the VRU are different by a predetermined angle or more (i.e., from which two or more VRU paths are branched) as the joint based on the path data. When the joints are determined, the SoftV2X server may extract path data at each of the joints from the path data (i.e., path data about the determined joint position or joint area) and may determine an angle for each of the VRU paths branched from the joint based on an average value of a change in a travel direction for each path branched from each joint from the extracted path data. In addition, the SoftV2X server may calculate a probability of each of the VRU paths branched from the joint based on the number of all moving VRUs and the number of moving VRUs for each path in the joint based on the extracted path data.

Then, the SoftV2X server may determine a VRU path (or node) formed between two joints based on the determined joints (S205). The SoftV2X server may generate node information that is information on a curvature, moving speed, and path width of each of the plurality of VRU paths based on the path data.

For example, when a first joint is connected to a second joint, and the second joint is connected to each of a third joint and a fourth joint, the SoftV2X server may determine a first VRU path between the first joint and the second joint, a second VRU path between the second joint and the third joint, and a third VRU path between the second joint and the third joint. In this case, the SoftV2X server may calculate and determine a curvature, a path with, and an average moving speed for the first VRU path through path data related to the first VRU path, may calculate and determine a curvature, a path with, and an average moving speed for the second VRU path through path data related to the second VRU path, and may calculate and determine a curvature, a path with, and an average moving speed for the third VRU path through path data related to the third VRU path. The determined curvature, path width, and average moving speed may include node information about each VRU path.

The path width corresponding to the VRU path may be determined using statistical method. In detail, the SoftV2X server may extract values required to determine the path width of the VRU path from the first path data related to the VRU path from the path data, and may perform normalization on the extracted position values (or calculation of a normal distribution function). The SoftV2X server may determine the path width based on the position values within a predetermined variance value (or standard deviation value) based on the calculated normal distribution function.

For example, the SoftV2X server may extract position values on a measuring cross section shown in FIG. 14 from the first path data. The SoftV2X server may calculate a normal distribution function based on the position values and may determine positions values within a predetermined variance value in the normal distribution function. The SoftV2X server may determine the maximum interval of the position values within the predetermined variance value as a path width of the VRU path.

The SoftV2X server may differently determine the predetermined variance value according to density of a VRU in the VRU path, congestion of a channel (e.g., a channel busy ratio (CBR) or a channel occupancy ratio (CR)), and the curvature. For example, when the density of the VRU or the congestion of the channel is equal to or greater than a first reference threshold, the predetermined variance value may be determined as a first value, and when the density of the VRU or the congestion of the channel is less than the first reference threshold, the predetermined variance value may be determined as a second value smaller than the first value. As the curvature is increased, the predetermined variance value may be reduced.

The SoftV2X server may determine the predetermined variance value based on position reliability included in the VRU message (or the first path data) related to the VRU path. For example, when the second VRU path is positioned in an area with low positioning accuracy due to an obstacle (i.e., when the position reliability is less than a second reference threshold), since a large error occurs in determining the path width, the SoftV2X server may reduce the predetermined variance value. In other words, when the position reliability is equal to or greater than a second reference threshold, the predetermined variance value may be determined as a third value, and when the position reliability is less than the second reference threshold, the predetermined variance value may be determined as a fourth value smaller than the third value.

Then, the SoftV2X server may generate node information about each of the plurality of the plurality of VRU paths and joint information about each of the joints and may transmit the VRU path map as a first message (S207).

As such, the SoftV2X server may generate a VRU path map including information on a plurality of joints and node information on a VRU path branched from each joint and may provide information on the position of a joint from which a VRU path is branched and a probability of traveling on a path branched from each joint, and information on a curvature, an average moving speed, and a path width for each of the branched VRU paths through the VRU path map.

The SoftV2X server may determine a zone ID corresponding to the joint using the predetermined width and latitude and longitude for the joint, and may generate a VRU path map including node information (or joint information) corresponding to each zone ID. In this case, the VRU path map may provide joint information and node information for joints for the respective zone IDs.

Alternatively, the SoftV2X server may determine a VRU that deviates from the VRU path among VRUs based on the path width. For example, when receiving a VRU message including information on a position of the VRU path with the determined path width, from which the VRU deviates, the SoftV2X server may transmit a warning message about deviation from the path for a specific VRU that transmits the VRU message.

Figure 26:
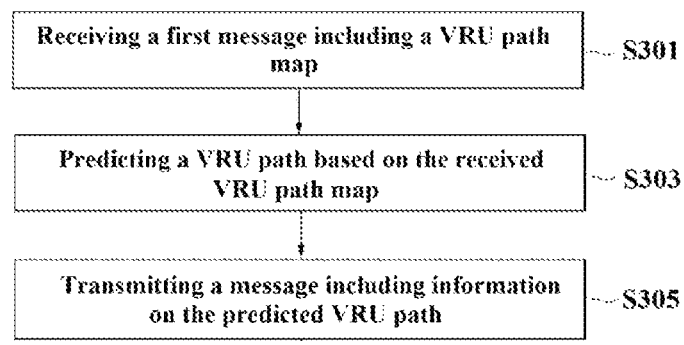
FIG. 26 is a diagram for explaining a method of predicting a path based on a VRU path map by a VRU.

FIG. 26 is a diagram for explaining a method of predicting a path based on a VRU path map by a VRU.

Referring to FIG. 26, the VRU may receive a first message including information on the VRU path map from the SoftV2X server (S301). As described above, the VRU path map may include information (a position of a joint, an ID of the joint, information on an adjacent joint, etc.) on a joint from which two or more VRU paths are branched, and information on a probability and an angle for each of the two or more paths branched from the joint. The VRU path map may further include node information about a second VRU path formed between two joints, and the node information may include probability information and angle information about each of the two or more VRU paths branched from the joints.

Then, the VRU may predict at least one VRU movement path based on the VRU path map (S303). The VRU may acquire two or more joints corresponding to a position of the VRU based on the VRU path map and may acquire node information about the second VRU path formed between the two or more joints. The VRU may predict a VRU path based on the node information and information on the two or more joints.

The VRU may determine at least one VRU path and a moving probability of each of the at least one VRU path based on angle and probability information for each of paths branched from a joint positioned on a travel direction of the VRU.

Then, the VRU device may transmit a second message including information on the determined at least one VRU path and information on the moving probability (S305).

The VRU device may not express a prediction movement path thereof in the form of the existing sequence when a path is predicted based on the VRU path map. For example, the VRU device may express the predicted movement path through information on the two or more joints determined based on the VRU path map and information on the moving probability. That is, the VRU device may provide the predicted VRU path to neighbor devices through information on joints related to the VRU device (or ID about each of the joints) and probability information related to each joint (probability information for each branched VRU path).

In this case, the VRU device may provide information on a VRU path predicted through transmission of the second message including identification information of the joint and related probability information, and thus the amount of data of information about the predicted path of the VRU device may be largely reduced. In addition, the amount of data of the prediction VRU path may be largely reduced, and thus the VRU device may provide information on a plurality of VRU paths through the second message without increase in the amount of data compared to before.

Communication System Example to which the Present Disclosure is Applied

Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 27:
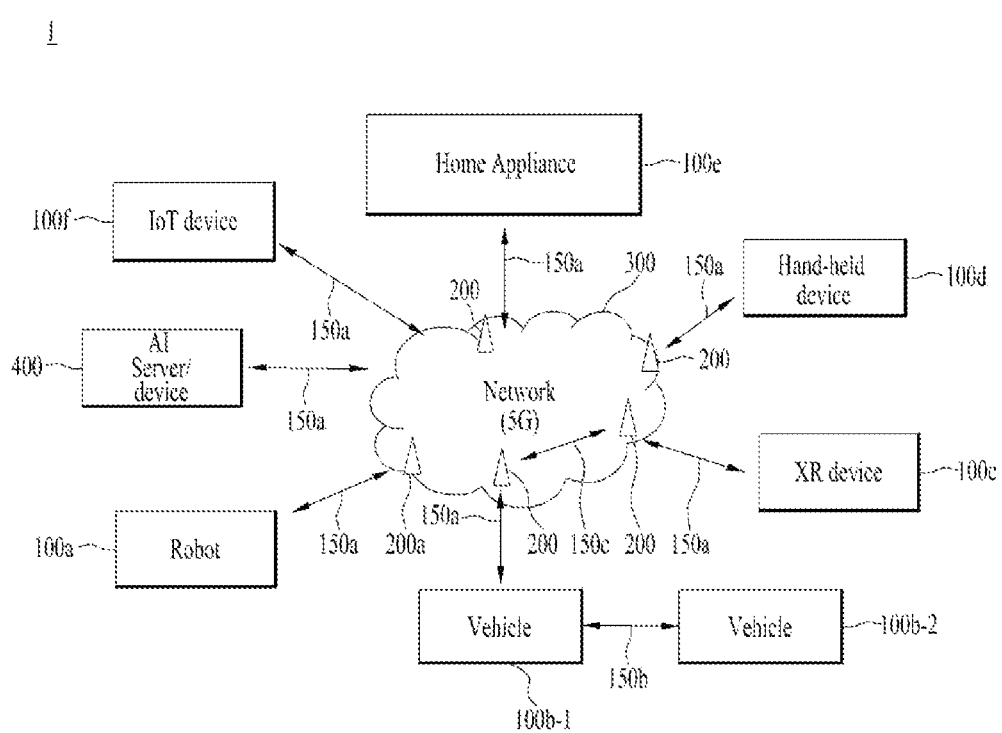
FIG. 27 illustrates a communication system applied to the present disclosure.

FIG. 27 illustrates a communication system applied to the present disclosure.

Referring to FIG. 27, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 28:
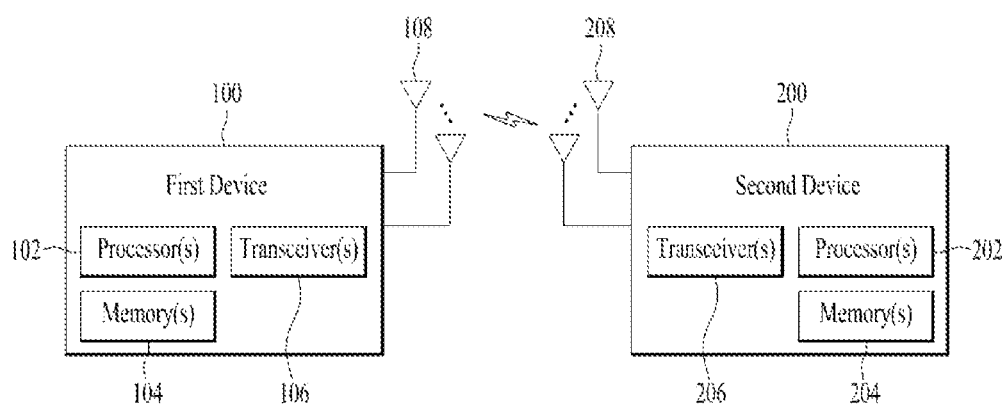
FIG. 28 illustrates wireless devices applicable to the present disclosure.

FIG. 28 illustrates a wireless device applicable to the present disclosure.

Referring to FIG. 28, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 27.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

In detail, the UE may include the processor 102 and the memory 104 which are connected to the RF transceiver. The memory 104 may include at least one program for performing an operation related to the embodiments described with reference to FIGS. 11 to 26.

The processor 102 may control the RF transceiver to collect path data from a plurality of VRU messages and to acquire a plurality of first VRU paths based on the path data, may determine joints from which two or more VRU paths are branched based on the plurality of first VRU paths, may determine a plurality of second VRU paths positioned between two joints based on the determined joints, may generate the VRU path map including node information for each of the determined plurality of second VRU paths, and may transmit a first message including information on the VRU path map. The processor 102 may perform the operations of generating the VRU path map described with reference to FIGS. 11 to 26 based on the program included in the memory 104.

A chip set including the processor 102 and the memory 104 may be configured. In this case, the chip set may include at least one processor and at least one memory operatively connected to the at least one processor and configured to cause the at least one processor to perform an operation when being executed.

At least one processor included in the chip set may collect path data from a plurality of VRU messages, may acquire a plurality of first VRU paths based on the path data, may determine joints from which two or more VRU paths are branched based on the plurality of first VRU paths, may determine a plurality of second VRU paths positioned between two joints based on the determined joints, may generate the VRU path map including node information for each of the determined plurality of second VRU paths, and may transmit a first message including information on the VRU path map.

Provided may be a computer-readable storage medium including at least one computer program for causing the at least one processor to perform an operation, and the operation may include collecting path data from a plurality of VRU messages, acquiring a plurality of first VRU paths based on the path data, determining joints from which two or more VRU paths are branched based on the plurality of first VRU paths, determining a plurality of second VRU paths positioned between two joints based on the determined joints, generating the VRU path map including node information for each of the determined plurality of second VRU paths, and transmitting a first message including information on the VRU path map. The computer program may perform the operations of generating the VRU path map described with reference to FIGS. 11 to 26.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Disclosure is Applied

Figure 29:
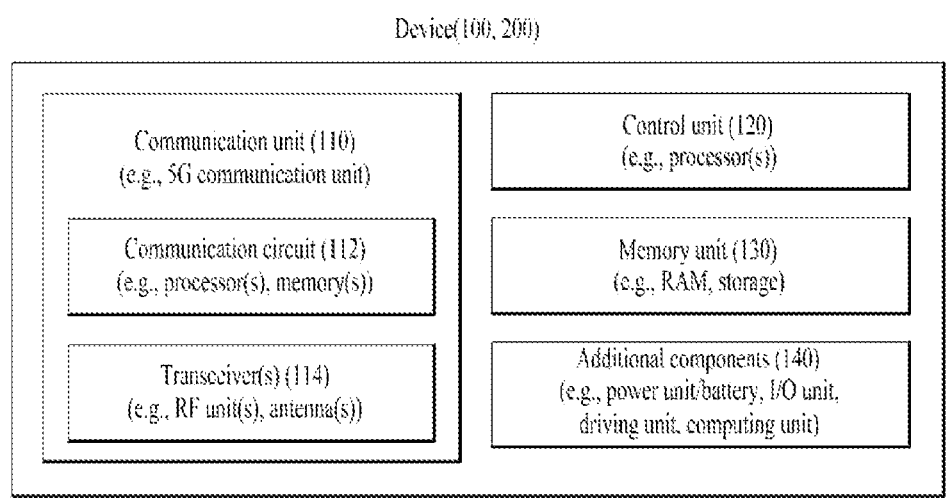
FIG. 29 illustrates another example of a wireless device to which the present disclosure is applied.

FIG. 29 illustrates another example of a wireless device applied to the present disclosure. The wireless device may be implemented in various forms according to a use-case/service (refer to FIG. 27)

Referring to FIG. 29, wireless devices 100 and 200 may correspond to the wireless devices 100 and 200 of FIG. 28 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 28. For example, the transceiver(s) 114 may include the one or more transceivers 106 and 206 and/or the one or more antennas 108 and 208 of FIG. 28. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 27), the vehicles (100*b*-1 and 100*b*-2 of FIG. 27), the XR device (100*c* of FIG. 27), the hand-held device (100*d* of FIG. 27), the home appliance (100*e* of FIG. 27), the IoT device (100*f* of FIG. 27), a digital broadcast terminal, a hologram device, a public safety device, an MTC device, a medicine device, a fintech device (or a finance device), a security device, a climate/environment device, the AI server/device (400 of FIG. 27), the BSs (200 of FIG. 27), a network node, etc. The wireless device may be used in a mobile or fixed place according to a use-example/service.

In FIG. 29, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 30:
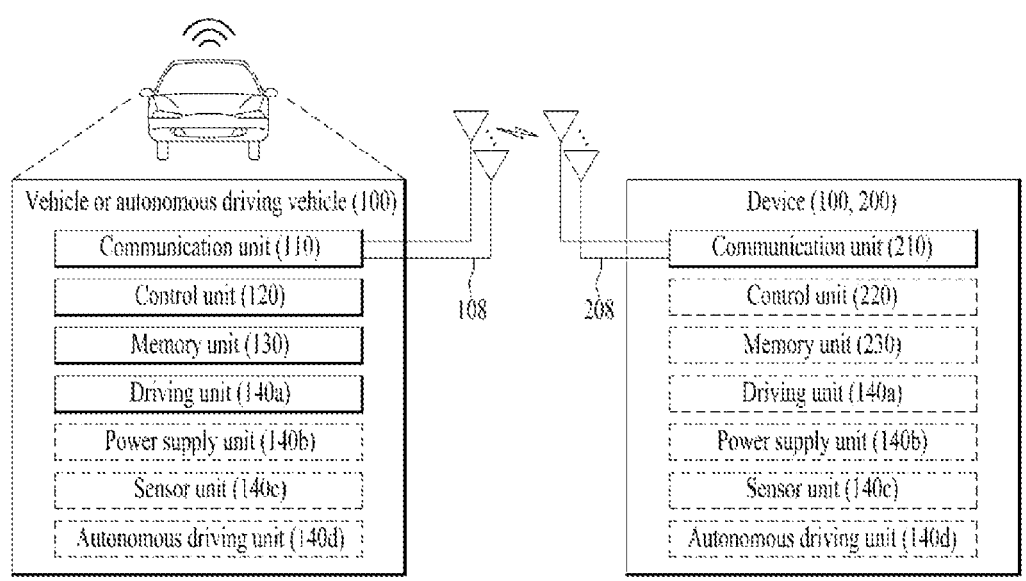
FIG. 30 illustrates a vehicle or an autonomous driving vehicle applied to the present disclosure.

Examples of Vehicles or Autonomous Vehicles to which the Present Disclosure is Applied FIG. 30 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 30, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 29, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the acquired data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly acquired data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Here, wireless communication technologies implemented in the wireless devices (XXX, YYY) of the present specification may include LTE, NR, and 6G, as well as Narrowband Internet of Things for low power communication. At this time, for example, the NB-IoT technology may be an example of a Low Power Wide Area Network (LPWAN) technology, and may be implemented in standards such as LTE Cat NB1 and/or LTE Cat NB2, and is not limited to the above-described names Additionally or alternatively, the wireless communication technology implemented in the wireless devices (XXX, YYY) of the present specification may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names. Additionally or alternatively, the wireless communication technology implemented in the wireless devices (XXX, YYY) of the present specification is at least one of ZigBee, Bluetooth, and Low Power Wide Area Network (LPWAN) considering low power communication, and is not limited to the above-described names. As an example, ZigBee technology can generate personal area networks (PANs) related to small/low-power digital communication based on various standards such as IEEE 802.15.4, and may be called various names.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL AVAILABILITY

The above-described embodiments of the present disclosure are applicable to various

The invention claimed is:

1. A method comprising:
   collecting path data including a plurality of paths from a plurality of messages of a plurality of devices;
   determining positions of joints where two or more paths branch off based on the path data;
   determining at least one path passing through two joints among the joints;
   generating a path map based on node information including information about the at least one path and joint information; and
   transmitting a first message including information on the path map,
   wherein the joint information includes angle information and probability information for each of the joints, and
   wherein the probability information for a joint is calculated using a total number of devices passing through the joint and the number of devices passing through each of the two or more paths branching off from the joint based on the path data.

2. The method of claim 1, wherein the node information includes a curvature, event information, a path width, and an average moving speed for each of the at least one path.

3. The method of claim 2, wherein the path width for a specific path among the at least one path is calculated based on a normal distribution function and a variance value for positions of devices passing through the specific path among the plurality of devices, and
   wherein the variance value is determined based on a channel congestion related to the specific path.

4. The method of claim 1, further comprising:
   determining a zone ID corresponding to the joint using a predetermined width and latitude and longitude for the joint, and wherein the path map provides information on joints corresponding to the respective zone IDs.

5. The method of claim 1, wherein each of the plurality of messages includes information on a sequence indicating a position of a device at a predetermined time interval for each of a plurality of paths of the device.

6. A non-transitory computer-readable medium in which program code for performing the method of claim 1 is recorded.

7. A server comprising:
   a radio frequency (RF) transceiver; and
   a processor connected to the RF transceiver,
   wherein the processor controls the RF transceiver to collect path data including a plurality of paths from a plurality of messages of a plurality of devices, determines positions of joints where two or more VRU paths are branch off based on the path data, determines at least one path passing through two joints among the joints, generates a path map based node information including information about the at least one path and joint information, and transmits a first message including information on the path map.

* * * * *